US012769493B2

(12) United States Patent
Yoshida

(10) Patent No.: US 12,769,493 B2
(45) Date of Patent: Oct. 20, 2026

(54) IMAGE FORMING APPARATUS AND EXECUTION METHOD

(71) Applicant: SHARP KABUSHIKI KAISHA, Sakai City (JP)

(72) Inventor: Mayuko Yoshida, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 241 days.

(21) Appl. No.: 18/637,248

(22) Filed: Apr. 16, 2024

(65) Prior Publication Data

US 2024/0385791 A1 Nov. 21, 2024

(30) Foreign Application Priority Data

May 19, 2023 (JP) ................................ 2023-083336

(51) Int. Cl.

*H04W 4/024* (2018.01)
*G06F 3/12* (2006.01)
*G06K 7/14* (2006.01)

(52) U.S. Cl.

CPC .......... *G06F 3/1292* (2013.01); *G06F 3/1204* (2013.01); *G06F 3/1225* (2013.01); *G06K 7/1417* (2013.01)

(58) Field of Classification Search

USPC ...................... 358/1.1–3.29, 1.11–1.18, 539, 358/426.04–440; 700/95–102, 115; 715/716–748, 823–824, 961–978

See application file for complete search history.

(56) References Cited

U.S. PATENT DOCUMENTS

| | | | | |
|---|---|---|---|---|
| 12,147,719 B2 * | 11/2024 | Onishi | G06F 3/1231 |
| 2010/0219240 A1 * | 9/2010 | Yang | G06F 16/9554 235/375 |
| 2021/0182004 A1 * | 6/2021 | Ogino | G06F 3/1288 |
| 2021/0234973 A1 * | 7/2021 | Hou | H04N 1/00244 |
| 2021/0286492 A1 * | 9/2021 | Gossweiler, III | H04N 21/4524 |

FOREIGN PATENT DOCUMENTS

JP 2017-092620 A 5/2017

OTHER PUBLICATIONS

Kim Yong Hwan; Elementary School Visiting Management Service System; 2020 (Year: 2020).*
Tsunoda Toshihisa; System for Individually Distributing Different Information (Content and Advertisement) to Multiple Digital Signage Devices, and Method for Distributing Appropriate Information for Each Target to View Signage Based on Location Information of Digital Signage Device; 2021 (Year: 2021).*

* cited by examiner

*Primary Examiner* — Marcellus J Augustin
(74) *Attorney, Agent, or Firm* — ScienBiziP, P.C.

(57) ABSTRACT

An image forming apparatus includes: an acquirer capable of acquiring a trigger from a terminal apparatus; a controller that executes a service communicable with an application executed on the terminal apparatus; a display; and an operation inputter. In a case where a trigger to start the service is acquired from the operation inputter, the controller displays on the display, a confirmation screen with which whether the application is installed in the terminal apparatus is confirmed, when executing the service. In a case where a trigger to start the service is acquired from the acquirer, the controller executes the service without displaying the confirmation screen on the display.

13 Claims, 24 Drawing Sheets

IMAGE FORMING APPARATUS AND EXECUTION METHOD

CROSS-REFERENCE TO RELATED APPLICATION

The present application claims priority from Japanese Application JP2023-083336, the content of which is hereby incorporated by reference into this application.

BACKGROUND OF THE INVENTION

1. Field of the Invention

The present disclosure relates to an image forming apparatus and the like.

2. Description of the Related Art

For a user setting an image forming apparatus using his or her terminal apparatus such as a smartphone, there has been a technique of installing an application in the terminal apparatus, after confirming with the user that the application is to be installed in the terminal apparatus.

SUMMARY OF THE INVENTION

An object of the disclosure is to provide an image forming apparatus and the like capable of appropriately confirming whether a necessary application is installed in a terminal apparatus capable of communicating with the image forming apparatus.

In response to the issue, an image forming apparatus according to the disclosure includes: an acquirer capable of acquiring a trigger from a terminal apparatus; a controller that executes a service communicable with an application executed on the terminal apparatus; a display; and an operation inputter. In a case where a trigger to start the service is acquired from the operation inputter, the controller displays on the display, a confirmation screen with which whether the application is installed in the terminal apparatus is confirmed, when executing the service. In a case where a trigger to start the service is acquired from the acquirer, the controller executes the service without displaying the confirmation screen on the display.

An image forming apparatus according to the disclosure includes: an acquirer capable of acquiring a trigger from a terminal apparatus; a controller that executes a service communicable with an application executed on the terminal apparatus; a display; and an operation inputter. In a case where a trigger to start the service is acquired from the operation inputter or a trigger to start the service is acquired from the acquirer, the controller executes the service corresponding to the acquired trigger.

An execution method of executing in an image forming apparatus, a service communicable with an application executed on a terminal apparatus according to the disclosure includes: reading a two-dimensional code displayed on an operation inputter of the image forming apparatus or on the terminal apparatus, to acquire a trigger; and executing a service corresponding to the acquired trigger.

The disclosure can provide an image forming apparatus and the like capable of appropriately confirming whether a necessary application is installed in a terminal apparatus capable of communicating with the image forming apparatus.

DETAILED DESCRIPTION OF THE INVENTION

An embodiment of the present disclosure will be described below with reference to the drawings. Note that the following embodiments are examples for describing the disclosure, and the technical scope of the invention described in the claims is not limited to the following description.

In an image forming apparatus (Multi-Function Printer/Peripheral (MFP)), selection of a service to be executed in the image forming apparatus, setting of a job, and the like are implemented in accordance with an operation input using a button or a touch panel provided to the image forming apparatus. In recent years, it has been possible to perform the selection of a service to be executed in an image forming apparatus, setting of a job, and the like, using an application used in a terminal apparatus such as a smartphone. For example, the user causes the image forming apparatus to execute a desired service by causing the image forming apparatus to read a two-dimensional code displayed, on the terminal apparatus, by an application running on the terminal apparatus. Thus, a plurality of methods may be available for the selection of a service to be executed in the image forming apparatus and the setting of a job.

When the image forming apparatus is set up using the terminal apparatus, a message related to the installation of the application therefor on the terminal apparatus may be displayed on the image forming apparatus.

In this context, unfortunately, the usability of the image forming apparatus might be compromised, in a case where the message or guiding display related to the application installation fails to be appropriately controlled. Still, such an issue has not been taken into consideration in the known technique.

In view of such an issue, in the following embodiments, a description will be given on an example of a method of appropriately controlling displaying of a guide or the like related to application installation in an image forming apparatus.

1. First Embodiment

1.1 Overall Configuration

Figure 1:
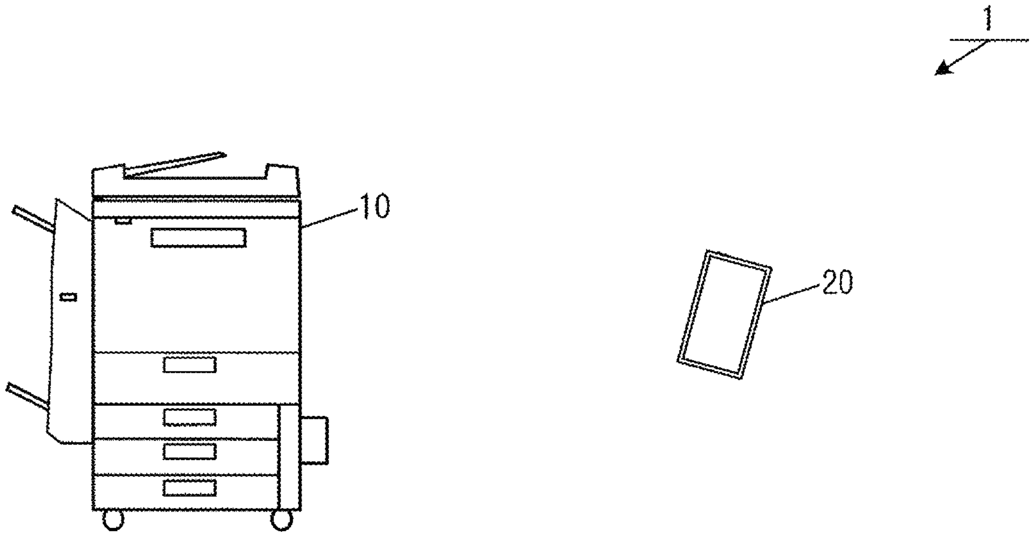
FIG. 1 is a diagram illustrating an overall configuration of a system of a first embodiment.

FIG. 1 is a diagram illustrating an overall configuration of a system 1 of the present embodiment. The system 1 includes an image forming apparatus 10 and a terminal apparatus 20.

The image forming apparatus 10 is an information processing apparatus capable of providing services such as a copy service, a scan service, a print service, and a facsimile transmission service. The image forming apparatus 10 is, for example, also referred to as a (digital) multi-function printer/peripheral (MFP).

The terminal apparatus 20 is an information processing apparatus capable of communicating with the image forming apparatus 10. The terminal apparatus 20 is constituted by a portable device such as a smartphone or a tablet for example.

1.2 Functional Configuration

1.2.1 Image Forming Apparatus

Figure 2:
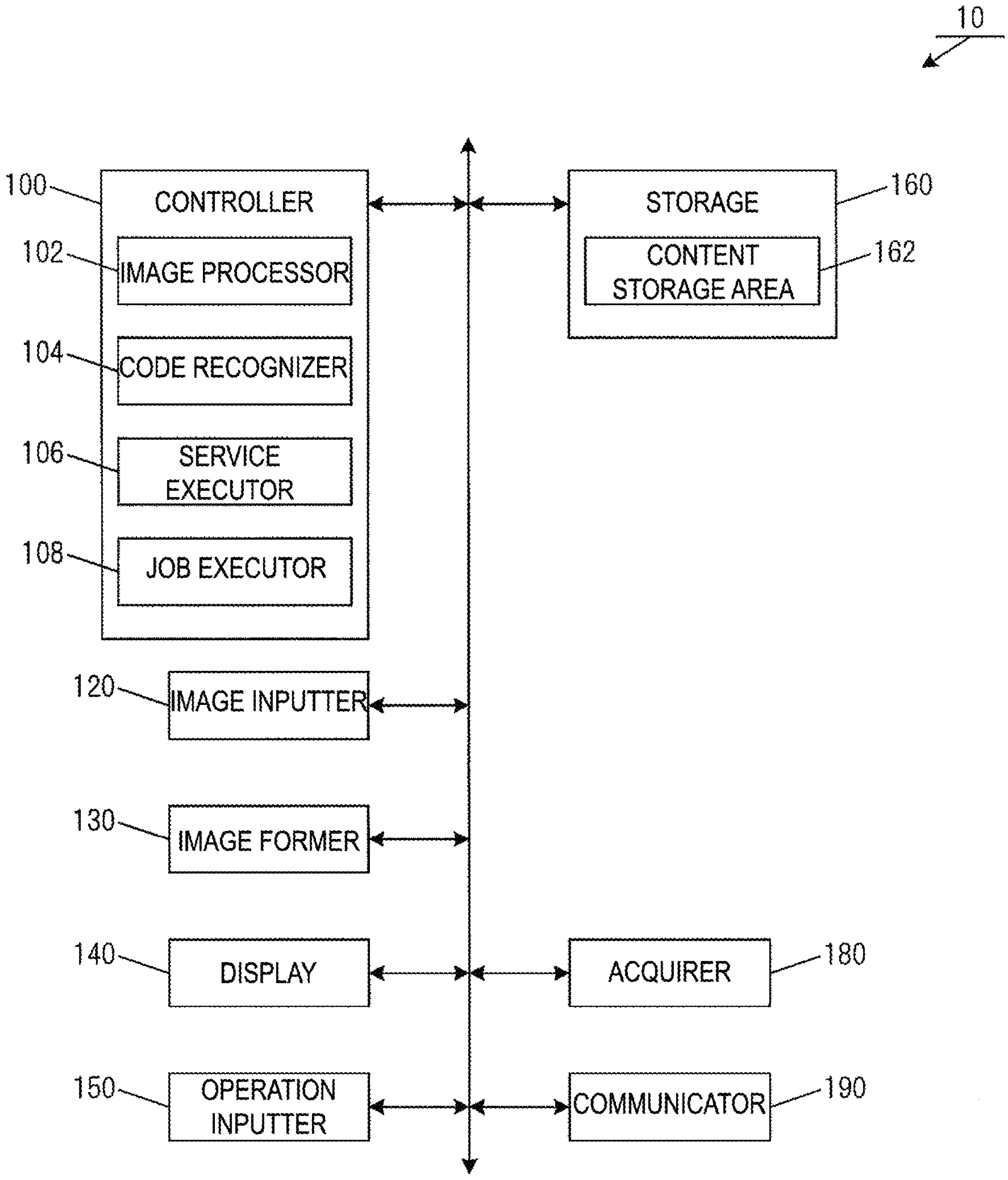
FIG. 2 is a diagram illustrating a functional configuration of an image forming apparatus of the first embodiment.

FIG. 2 is a diagram illustrating a functional configuration of an image forming apparatus 10. As illustrated in FIG. 2, the image forming apparatus 10 includes a controller 100, an image inputter 120, an image former 130, a display 140, an operation inputter 150, a storage 160, an acquirer 180, and a communicator 190.

The controller 100 controls the entirety of the image forming apparatus 10. The controller 100 realizes various functions by reading and executing various programs stored in the storage 160. The controller 100 is constituted by, for example, one or a plurality of arithmetic devices (such as central processing units (CPUs)). The controller 100 may be configured as a system on a chip (SoC) having a plurality of functions among the functions described below.

The controller 100 executes a program stored in the storage 160 to function as an image processor 102, a code recognizer 104, a service executor 106, and a job executor 108.

The image processor 102 executes image processing. For example, the image processor 102 executes image processing such as sharpening processing and tone conversion processing on an image input via the image inputter 120 and the communicator 190.

The code recognizer 104 recognizes a two-dimensional code acquired by the acquirer 180 to be described below. The service executor 106 executes a service corresponding to a trigger acquired based on the two-dimensional code read by the acquirer 180 or the operation on the operation inputter 150. The trigger is a trigger for causing the image forming apparatus 10 to start providing a service. The trigger may be, for example, a specific operation by the user or specific information acquired from another device. The job executor 108 executes a job based on an operation by the user. Processing executed by the code recognizer 104, the service executor 106, and the job executor 108 will be described below.

The image inputter 120 inputs an image to the image forming apparatus 10. The image inputter 120 may be constituted by, for example, a scanner device that reads a document placed on a platen. The scanner device is, for example, a device that converts an image into an electric signal using an image sensor such as a charge coupled device (CCD) or a contact image sensor (CIS), and quantizes and encodes the electric signal.

The image former 130 forms (prints) an image on a recording medium such as a recording sheet. The image former 130 may be constituted by, for example, a printing device such as a laser printer using an electrophotographic system. The image former 130, for example, feeds a recording sheet from a sheet feed tray provided in the image forming apparatus 10, forms an image on a surface of the recording sheet, and discharges the recording sheet from a sheet discharge tray provided in the image forming apparatus 10.

The display 140 displays various types of information and an operation screen. The display 140 may be constituted by, for example, display devices such as a liquid crystal display (LCD), an organic electro-luminescence (EL) display, and a micro light emitting diode (LED) display.

The operation inputter 150 receives an operation command from the user who uses the image forming apparatus 10. The operation inputter 150 may be constituted by an input device such as a key switch (hard key) or a touch sensor. A system for detecting an input by contact (touch) on the touch sensor may be a general detection system such as a resistive film system, an infrared system, an electromagnetic induction system, or a capacitance system. The image forming apparatus 10 may be provided with a touch panel in which the display 140 and the operation inputter 150 are integrally formed.

The storage 160 stores various programs and various types of data necessary for the operation of the image forming apparatus 10. The storage 160 may be constituted by, for example, a storage device (auxiliary storage device) such as a read only memory (ROM), a random access memory (RAM), a solid state drive (SSD) which is a semiconductor memory, or a hard disk drive (HDD).

A content storage area 162 for storing a content such as image data is ensured in the storage 160. The content storage area 162 may store the content in a form of a file.

The acquirer 180 acquires a trigger output by another apparatus such as the terminal apparatus 20. In the present embodiment, a description is given assuming that the acquirer 180 acquires a trigger by reading a two-dimensional code such as a QR code (trade name) displayed on the terminal apparatus 20. In addition, the QR code may be, for example, an image in which information identifying a service selected by the user on the terminal apparatus 20 is encoded, or an image in which information identifying a content requested to be output by the user is encoded. The acquirer 180 is constituted by, for example, a code reader capable of reading a two-dimensional code.

The communicator 190 communicates with another apparatus such as the terminal apparatus 20 or a device over a network such as a local area network (LAN) or a wide area network (WAN). The communicator 190 may be constituted by a communication device or a communication module such as a network interface card (NIC) used in a wired/wireless LAN, for example. Note that the communicator 190 may include an interface (network I/F) connectable to a network.

1.2.2 Terminal Apparatus

Figure 3:
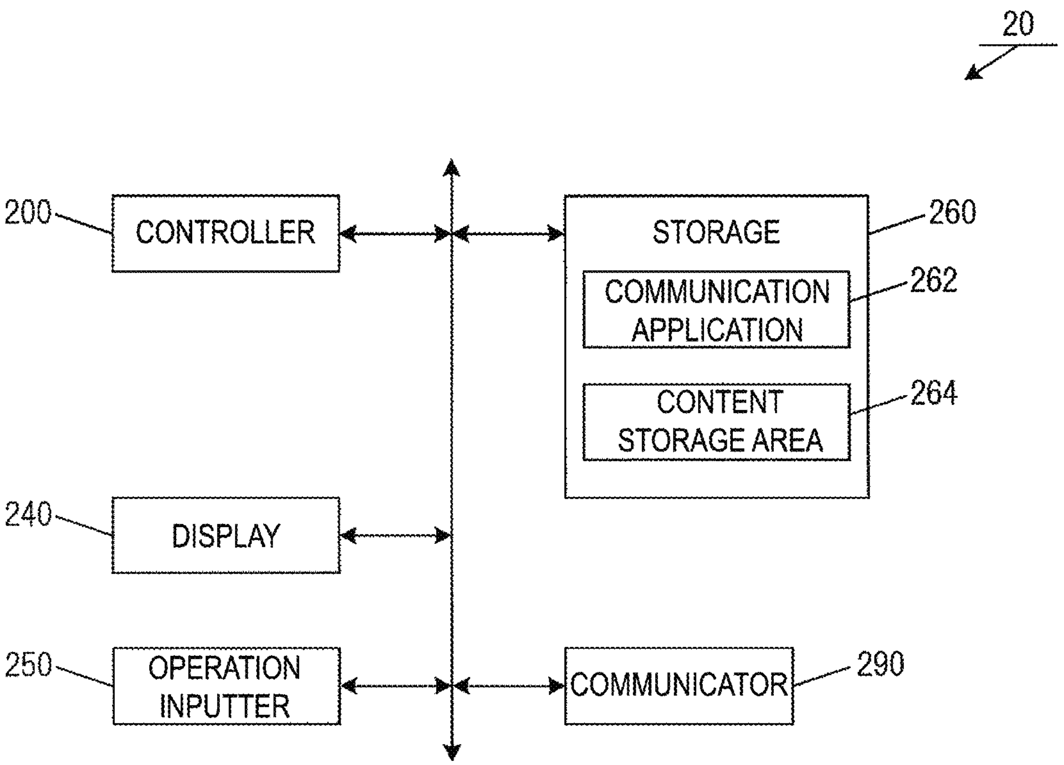
FIG. 3 is a diagram illustrating a functional configuration of a terminal apparatus of the first embodiment.

FIG. 3 is a diagram illustrating a functional configuration of the terminal apparatus 20. As illustrated in FIG. 3, the terminal apparatus 20 includes a controller 200, a display 240, an operation inputter 250, a storage 260, and a communicator 290.

The controller 200 controls the entirety of the terminal apparatus 20. The controller 200 realizes various functions by reading and executing various programs stored in the storage 260. The controller 200 may be constituted by, for example, one or a plurality of arithmetic devices (such as CPUs). The controller 200 may be configured as an SoC having a plurality of functions among the functions described below.

The display 240 displays various types of information. The display 240 may be constituted by display devices such as an LCD, an organic EL display, and a micro LED display.

The operation inputter 250 receives an operation command from a user who uses the terminal apparatus 20. The operation inputter 250 may be constituted by an input device such as a keyboard or a touch sensor. A touch panel in which the display 240 and the operation inputter 250 are integrally formed may be mounted on the terminal apparatus 20. The operation inputter 250 may be configured as an interface connectable to an input device such as a keyboard or a mouse.

The storage 260 stores various programs and various types of data necessary for the operation of the terminal apparatus 20. The storage 260 may by constituted by a storage device such as a ROM, a RAM, an SSD, or an HDD.

In the storage 260, a communication application 262 is stored, and a content storage area 264 is secured as a storage area.

The communication application 262 is read and executed by the controller 200 to realize connection and communication between the terminal apparatus 20 and the image forming apparatus 10. The communication application 262 is stored in the storage 260 by being installed by the user.

The content storage area 264 stores a content such as image data. The content storage area 264 may store the content in a form of a file.

The communicator 290 communicates with an external apparatus such as the image forming apparatus 10 over a LAN or a WAN. The communicator 290 may be constituted by a communication device or a communication module such as an NIC used in a wired/wireless LAN.

1.3 Processing Flow

1.3.1 Main Processing of Image Forming Apparatus

Figure 4:
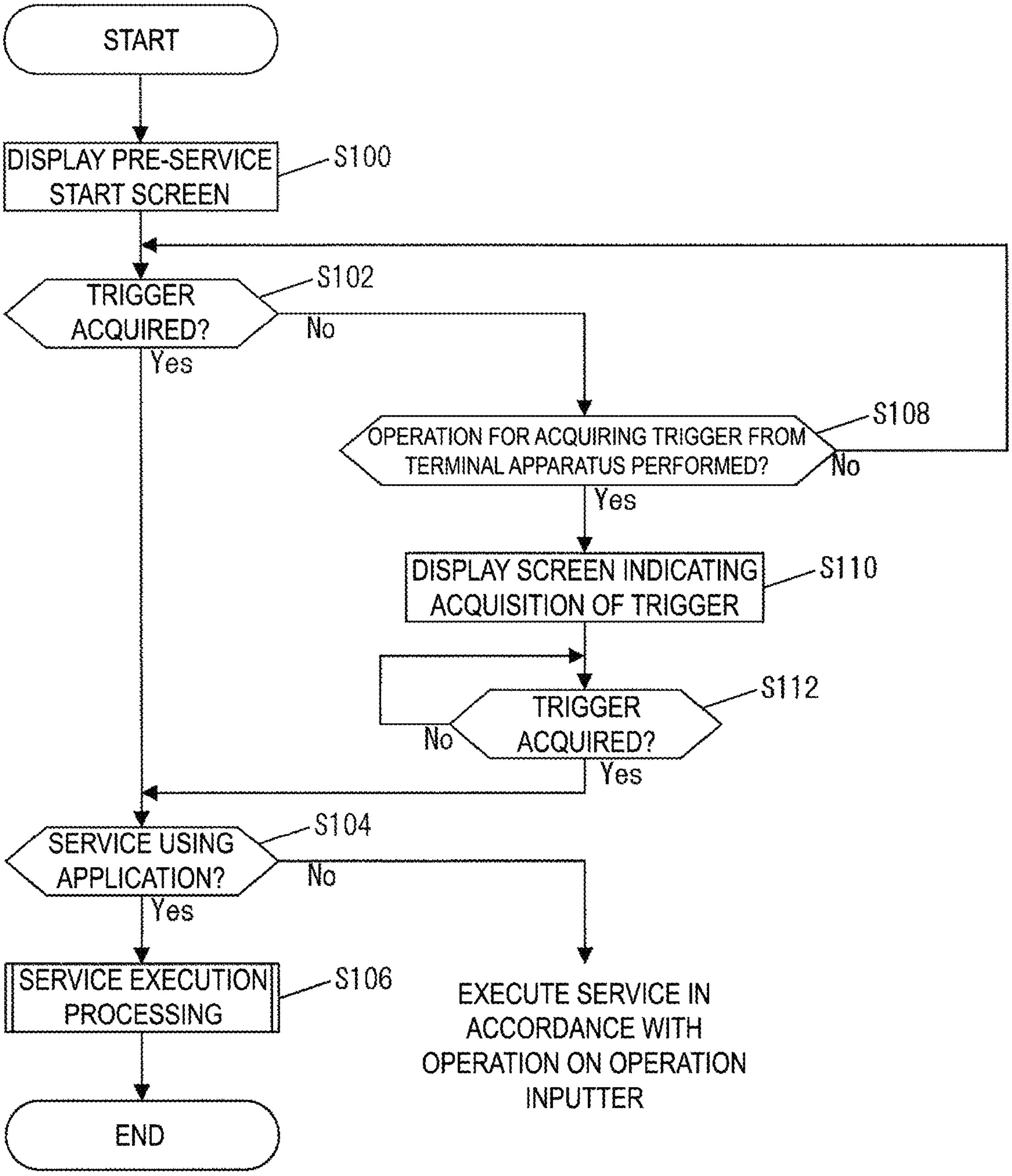
FIG. 4 is a flowchart illustrating main processing by the image forming apparatus of the first embodiment.

FIG. 4 is a flowchart illustrating a flow of main processing executed by the controller 100. First, the controller 100 displays a pre-service screen on the display 140 (step S100). The pre-service screen is a display screen displayed before the start of provision of a service, and is, for example, a portal screen or a screen saver screen.

The portal screen is a screen used by the user to select a service provided by the image forming apparatus 10. For example, the controller 100 performs the display when it is detected that the use of the image forming apparatus 10 by the user has started, or when some operation is input by the user using the operation inputter 150 while the screen saver screen is being displayed.

Subsequently, the controller 100 determines whether a trigger is acquired (step S102). Here, in the present embodiment, the controller 100 determines that the trigger is acquired in any of the following cases.

(1) A case where an operation of selecting a service on the portal screen is input by the user using the operation inputter 150.

(2) A case where a two-dimensional code obtained by encoding information enabling identification of a service or a content is read by the acquirer 180.

Here, when the two-dimensional code is read by the acquirer 180, the code recognizer 104 recognizes the two-dimensional code to identify the service executed by the image forming apparatus 10 and the content output by the image forming apparatus 10. When the two-dimensional code fails to be recognized by the code recognizer 104 or when the information recognized by the two-dimensional code is inappropriate, the controller 100 may determine that the trigger is not acquired. The case where the information recognized by the two-dimensional code is inappropriate is, for example, a case where a service or content cannot be identified from the information encoded by the two-dimensional code.

When the trigger is acquired, the controller 100 determines whether the service whose provision is started by the trigger is a service using the communication application installed in the terminal apparatus 20 (step S104).

Upon determining that the service uses the communication application, the controller 100 executes service execution processing (Yes in step S104, the processing proceeds to step S106). The service execution processing will be described below. On the other hand, upon determining that the service does not use the communication application (No in step S104), the controller 100 executes the service in accordance with the operation on the operation inputter 150 by the user.

Upon determining in step S102 that the trigger is not acquired, the controller 100 determines whether an operation for acquiring the trigger from the terminal apparatus 20 is performed by the user while the portal screen is being displayed (No in step S102, the processing proceeds to step S108). For example, the controller 100 displays a button for commanding acquisition of the trigger from the terminal apparatus 20 on the portal screen, and when the button is selected by the user, the controller 100 determines that the operation for acquiring the trigger from the terminal apparatus 20 is performed by the user.

Upon determining that the operation for acquiring the trigger from the terminal apparatus 20 is performed, the controller 100 displays on the display 140, a screen (first guide screen) indicating that the trigger is to be acquired from the terminal apparatus 20 (Yes in step S108, the processing proceeds to step S110).

Subsequently, the controller 100 determines whether the trigger is acquired from the terminal apparatus 20 by the acquirer 180 (step S112). Upon determining that the trigger is not acquired (No in step S112), the controller 100 repeats the processing in step S112. On the other hand, upon determining that the trigger is acquired, the controller 100 executes the processing in step S104 (Yes in step S112, the processing proceeds to step S104).

When the controller 100 determines that the operation for acquiring the trigger from the terminal apparatus 20 is not performed by the user in step S108, the processing returns to step S102 (No in step S108, the processing returns to step S102).

1.3.2 Service Execution Processing

Figure 5:
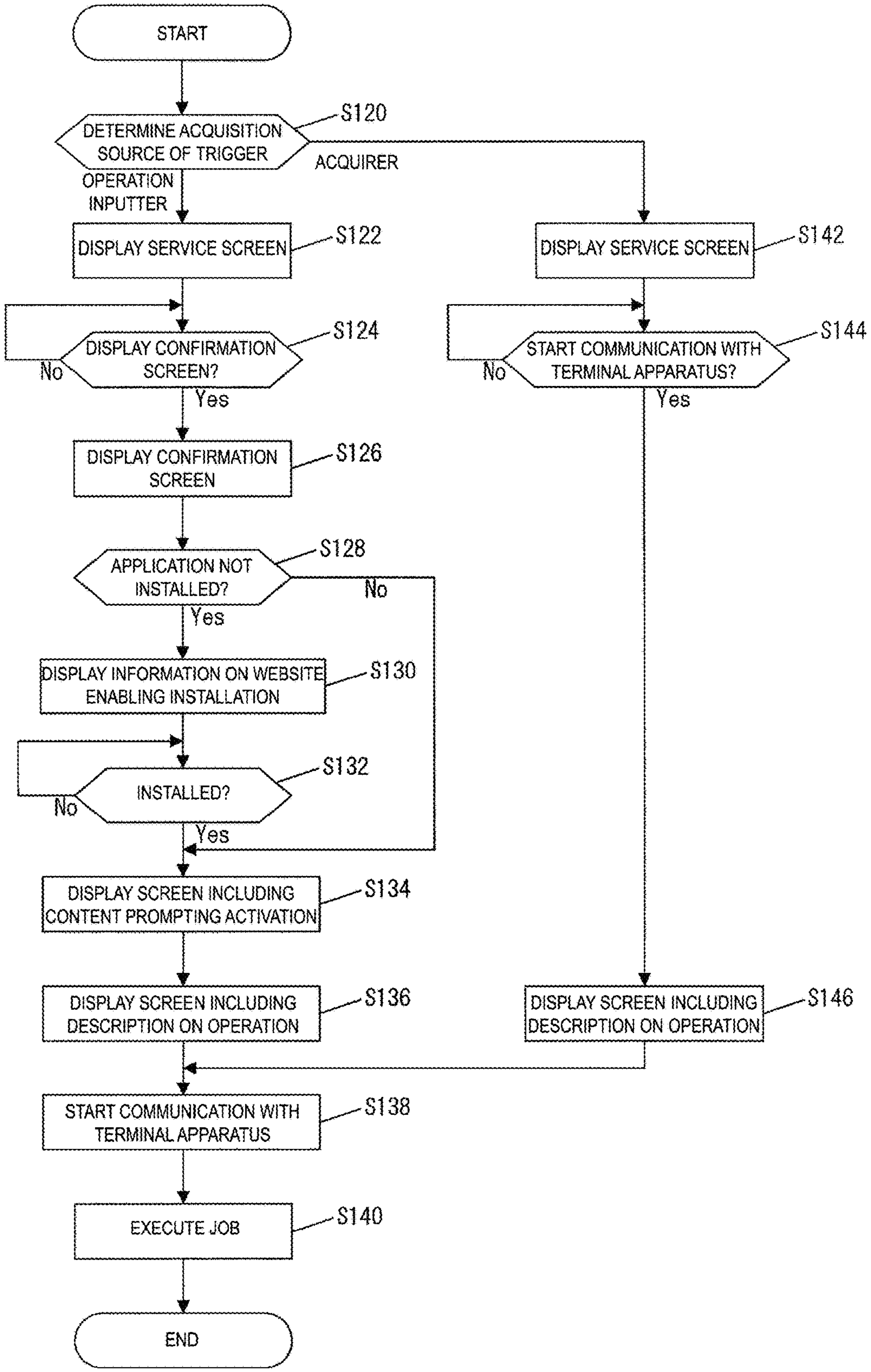
FIG. 5 is a flowchart of service execution processing of the first embodiment.

FIG. 5 is a flowchart illustrating a flow of the service execution processing executed by the controller 100. First, the service executor 106 determines the acquisition source of the trigger acquired while the pre-service screen is being displayed in step S102 in FIG. 4 (step S120).

Upon determining that the acquisition source of the trigger is the operation inputter 150, the service executor 106 executes a service corresponding to the trigger and displays a service screen corresponding to the service on the display 140 (operation inputter in step S120, the processing proceeds to step S122). The service screen is an operation screen that receives an operation of setting a service provided by the image forming apparatus 10 from the user and displays information related to the service.

Next, the service executor 106 determines whether to display a confirmation screen on the display 140 (step S124). The confirmation screen is a screen for confirming whether the communication application is installed in the terminal apparatus 20. For example, in a case where the setting for the service is performed on the service screen by the user using the operation inputter 150, the service executor 106 determines to display the confirmation screen when all inputs related to the setting of the service are completed (when an input for the last setting item is performed). The service executor 106 may display on the display 140, a screen indicating the start of communication with the terminal apparatus 20, and determine to display the confirmation screen when the user performs an operation to permit the start of the communications with the terminal apparatus 20. Thus, when a predetermined operation is performed on the service screen, the service executor 106 determines to display the confirmation screen.

Upon determining that the confirmation screen is not to be displayed (No in step S124), the service executor 106 repeats the processing in step S124.

Upon determining to display the confirmation screen, the service executor 106 displays the confirmation screen on the display 140 (Yes in step S124, the processing proceeds to step S126).

Next, the service executor 106 determines whether the communication application is installed in the terminal apparatus 20 (step S128). For example, the service executor 106 displays, on the confirmation screen, a button on which an operation can be input indicating whether the communication application is installed. In this case, the service executor 106 may determine whether the communication application is installed in the terminal apparatus 20 according to the button selected by the user.

Upon determining that the communication application is not installed in the terminal apparatus 20, the service executor 106 displays on the display 140, information on a website where the communication application can be installed (Yes in step S128, the processing proceeds to step S130). The website where the communication application can be installed may be a store from which the communication application can be acquired. For example, when the operation indicating that the communication application is not installed is input on the confirmation screen, the service executor 106 displays a screen including a guide for the website where the communication application can be installed. At this time, the service executor 106 may display a two-dimensional code including information (for example, a URL) of the website, as a guide display for guiding the user to access the website where the communication application can be installed.

The service executor 106 determines whether the communication application is installed in the terminal apparatus 20 (step S132). For example, the service executor 106 displays a button for indicating that the communication application is installed in the terminal apparatus 20 or a button for switching to the next screen, and when the button is selected by the user, the service executor 106 determines that the communication application is installed in the terminal apparatus 20. Note that the service executor 106 may receive, from the terminal apparatus 20 via the communicator 190, information with which whether the communication application is installed can be determined, and determine whether the communication application is installed according to the information.

Upon determining that the communication application is not installed in the terminal apparatus 20 (No in step S132), the service executor 106 repeats the processing in step S132.

When the service executor 106 determines that the communication application is installed in the terminal apparatus 20 (Yes in step S132), or when the service executor 106 determines that the communication application is installed in the terminal apparatus 20 (No in step S128), the service executor 106 displays on the display 140, a screen (second guide screen) including a content for prompting the user to activate the communication application (step S134).

In addition, the service executor 106 displays on the display 140, a screen including a description on the operation on the communication application (step S136).

Subsequently, the job executor 108 starts communicating with the terminal apparatus 20 via the communicator 190 (step S138). For example, the job executor 108 establishes connection with the terminal apparatus 20 by configuring a network of an ad hoc mode and connecting the terminal apparatus 20 to the network via the communicator 190. In addition, the job executor 108 receives, from the terminal apparatus 20 via the communicator 190, a setting made on the terminal apparatus 20, information indicating the content of the setting made on the terminal apparatus 20, and the like.

The job executor 108 executes the job based on the setting made by the user on the service screen and the communications with the terminal apparatus 20 (step S140). For example, the job executor 108 acquires a content (for example, image data) from the terminal apparatus 20 via the communicator 190 and stores the content in the content storage area 162. Furthermore, the job executor 108 may read the content stored in the content storage area 162, and output (print) an image based on the content via the image former 130. The job executor 108 may read a document using the image inputter 120 and transmit image data of the document to the terminal apparatus 20 as the content via the communicator 190.

On the other hand, upon determining in step S120 that the trigger is acquired via the acquirer 180, the service executor 106 executes a service corresponding to the trigger and displays on the display 140, a service screen corresponding to the service (acquirer in step S120, the processing proceeds to step S142). For example, when a trigger enabling identification of a service is acquired as the trigger, the service executor 106 displays a service screen corresponding to the service. When a trigger enabling identification of the content is acquired as the trigger, the service executor 106 displays a service screen for a print service for printing the content.

Next, the service executor 106 determines whether to start the communications with the terminal apparatus 20 (step S144). Upon determining that the communications with the terminal apparatus 20 are not to be started (No in step S144), the service executor 106 repeats the processing in step S144. For example, when all inputs related to the setting of the service via the operation inputter 150 are completed, the service executor 106 determines to start the communications with the terminal apparatus 20.

Upon determining to start the communications with the terminal apparatus 20, the service executor 106 displays on the display 140, a screen including a description on an operation on the communication application (Yes in step S144, the processing proceeds to step S146). That is, when a trigger is acquired from the other apparatus, even though no operation for acquiring a trigger from another apparatus such as the terminal apparatus 20 performed while the portal screen is being displayed, the service executor 106 omits the processing of displaying the second guide screen.

After the processing in step S144 is executed, the job executor 108 executes the processing in step S138 and step S140 to execute the job based on the setting made by the user on the service screen and the communications with the terminal apparatus 20.

1.3.3 Main Processing by Terminal Apparatus

Figure 6:
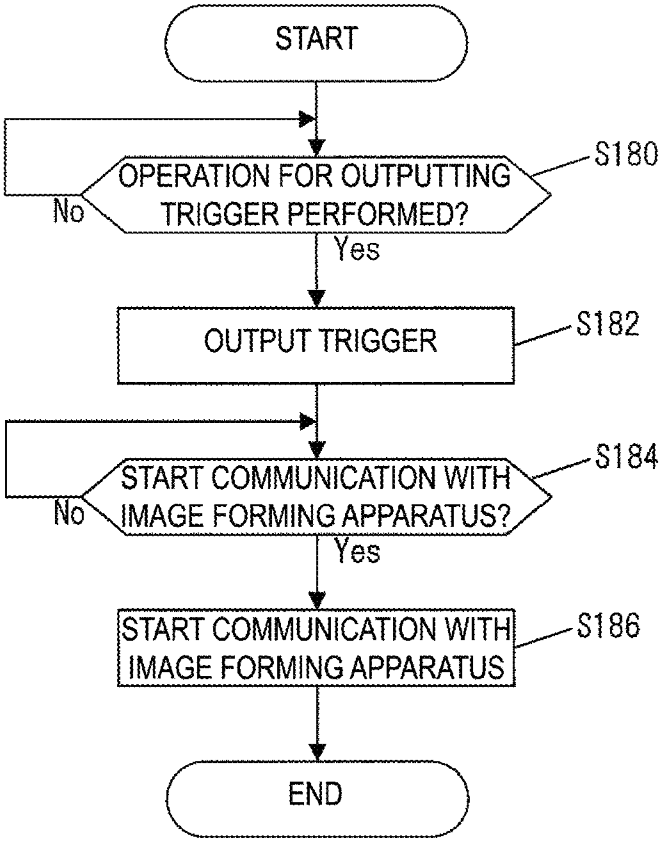
FIG. 6 is a flowchart of main processing by the terminal apparatus of the first embodiment.

FIG. 6 is a flowchart illustrating a flow of main processing executed by the controller 200 by reading the communication application 262. First, the controller 200 determines whether an operation for outputting a trigger is performed by the user (step S180). The operation for outputting the trigger is, for example, an operation for selecting a service desired to be used or an operation of completing the setting related to the service in the terminal apparatus 20.

Upon determining that the operation for outputting the trigger is performed, the controller 200 outputs the trigger (Yes in step S180, the processing proceeds to step S182). For example, the controller 200 outputs the trigger by displaying on the display 240, a two-dimensional code obtained by encoding information indicating a service selected to be used by the user or information indicating the content of setting for the service. While the operation for outputting the trigger is not performed (No in step S180), the controller 200 repeats the processing in step S180.

Subsequently, the controller 200 determines whether to start the communications with the image forming apparatus 10 (step S184). Upon determining to start the communications with the image forming apparatus 10, the controller 200 establishes connection with the image forming apparatus 10 and starts communications with the image forming apparatus 10 via the communicator 290 (Yes in step S184, the processing proceeds to step S186). For example, the controller 200 reads the content selected by the user from the content storage area 264 and transmits the content to the image forming apparatus 10. Further, the controller 200 may receive the content (for example, image data) transmitted from the image forming apparatus 10 and store the content in the content storage area 264. Upon determining not to perform the communications with the image forming apparatus 10 (No in step S184), the controller 200 repeats the processing in step S184.

1.4 Operation Example

Figure 7A:
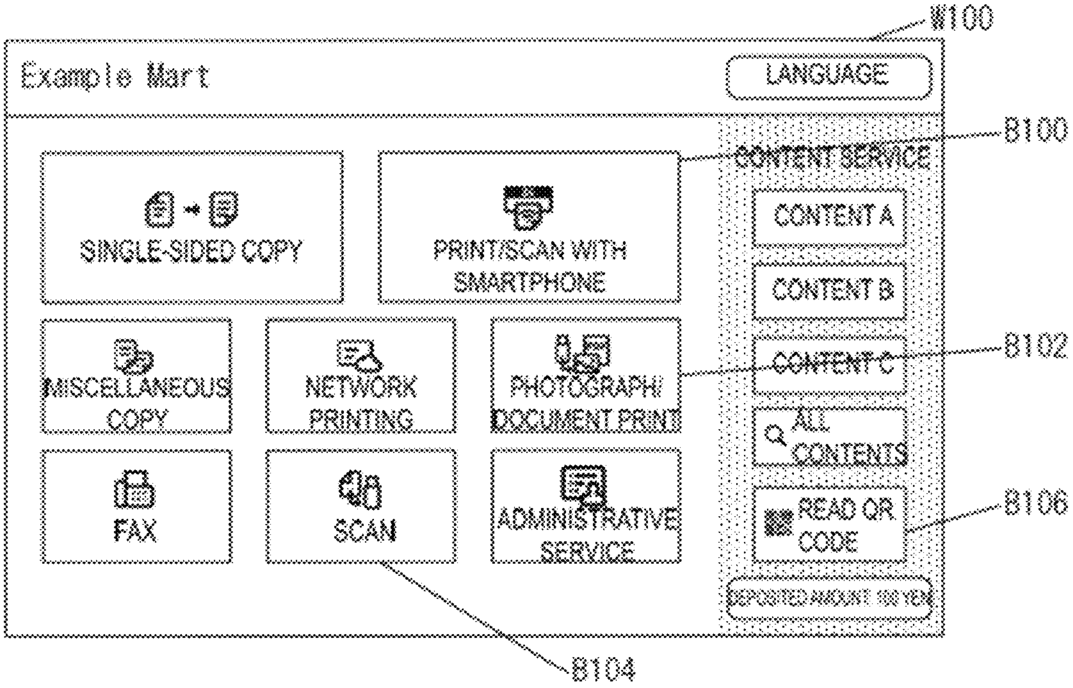
FIG. 7A is a diagram illustrating an operation example of the first embodiment.

FIGS. 7A to 14B are diagrams illustrating an example of screens displayed on the display 140. FIG. 7A is a diagram illustrating an example of a portal screen W100. The portal screen W100 includes service buttons for selecting services that can be provided by the image forming apparatus 10. For example, the service buttons in FIG. 7A include a button B100 for commanding use of a print/scan service using a smartphone, a button B102 for commanding use of a photograph/document print service, a button B104 for commanding use of a scan service, and the like. The portal screen W100 further includes a button B106 for commanding reading of the two-dimensional code as the trigger from the terminal apparatus 20.

Figure 7B:
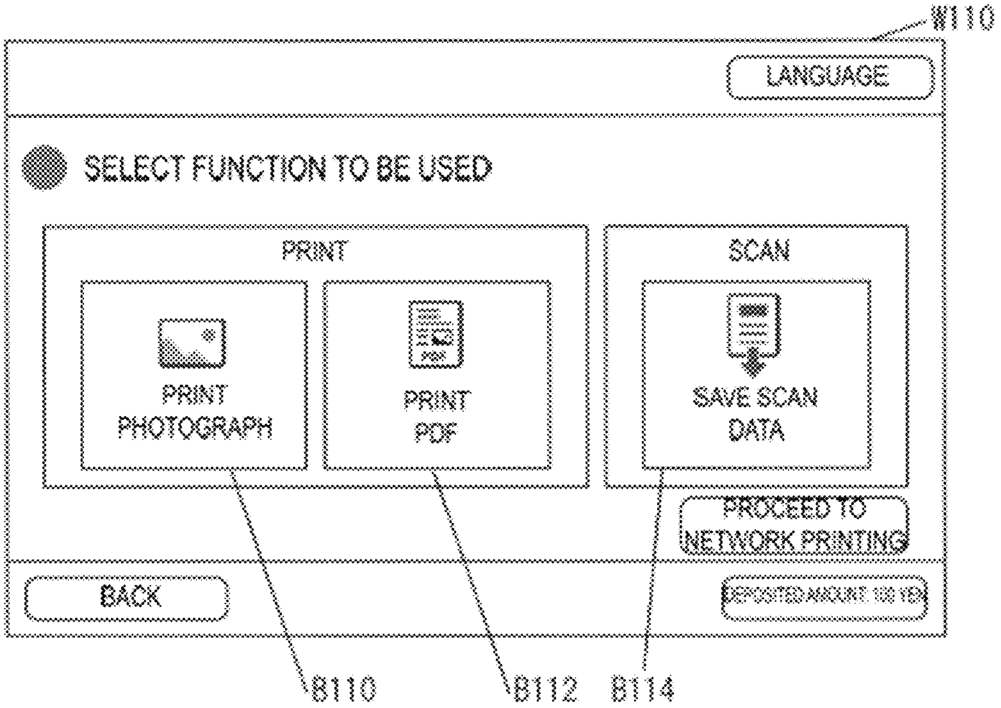
FIG. 7B is a diagram illustrating an operation example of the first embodiment.

FIG. 7B is a diagram illustrating an example of a service screen W110 displayed when the button B100 is selected on the portal screen W100. The service screen W110 includes, for example, a button B110 for commanding photograph printing, a button B112 for commanding Portable Document Format (PDF) printing, and a button B114 for commanding saving of a scan data. The user can cause the image forming apparatus 10 to execute desired processing by selecting one of the button B110, the button B112, and the button B114. When any one of the button B110, the button B112, and the button B114 is selected by the user, all settings in the image forming apparatus 10 are completed. Thus, the confirmation screen is displayed.

Figure 8A:
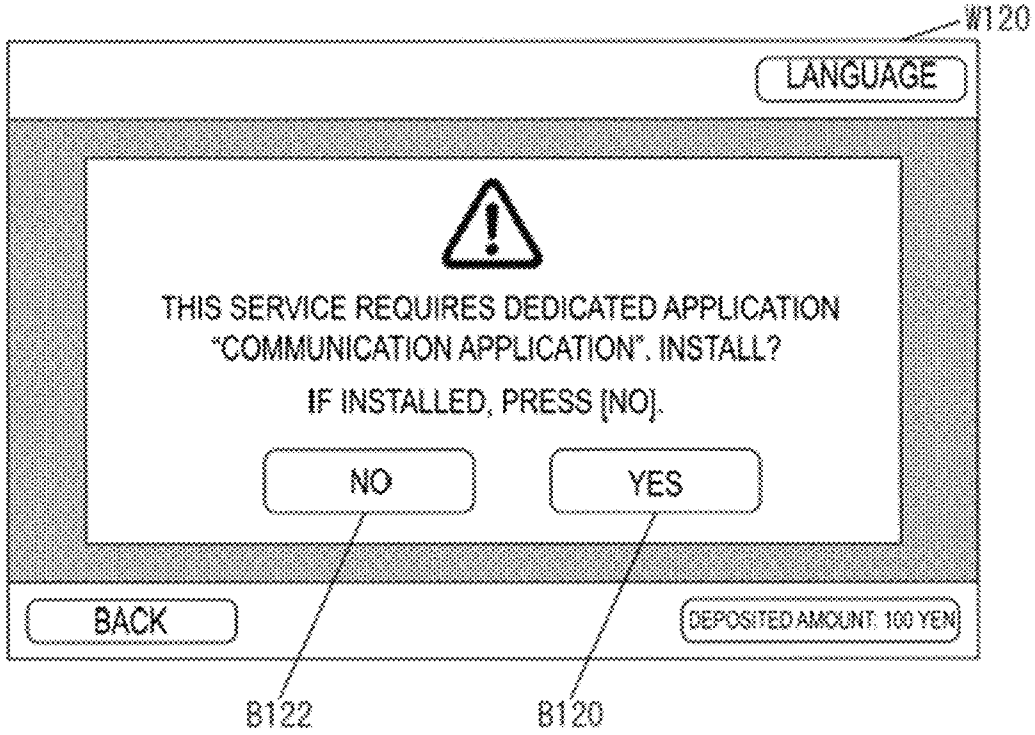
FIG. 8A is a diagram illustrating an operation example of the first embodiment.

FIG. 8A is a diagram illustrating an example of a confirmation screen W120. The confirmation screen W120 includes a button B120 for commanding installation of the communication application for the terminal apparatus 20 in which the communication application is not installed, and a button B122 for commanding that the communication application not to be installed because the communication application is already installed in the terminal apparatus 20. By selecting the button B120 or the button B122, the user can input to the image forming apparatus 10, whether the communication application is installed in the terminal apparatus 20.

Figure 8B:
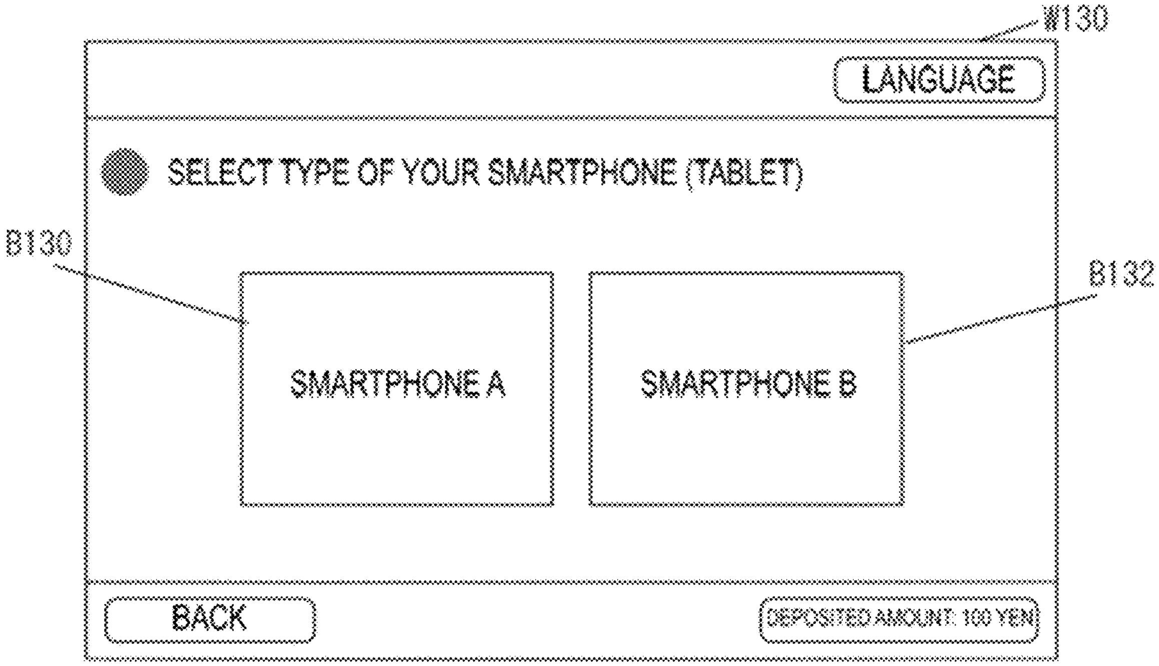
FIG. 8B is a diagram illustrating an operation example of the first embodiment.

FIG. 8B is a diagram illustrating an example of a screen W130 on which the user selects the type of his or her smartphone, displayed when the button B120 is selected on the confirmation screen W120. The screen W130 includes buttons (for example, a button B130 and a button B132) for selecting the type of the smartphone. Here, the type of the smartphone may be selectable by an operating system (OS) installing the communication application. For example, it is possible to select a smartphone A (for example, Android (trade name)) using the button B130 and a smartphone B (for example, iOS, iPhone (trade name), iPad (trade name)) using the button B132.

Figure 9:
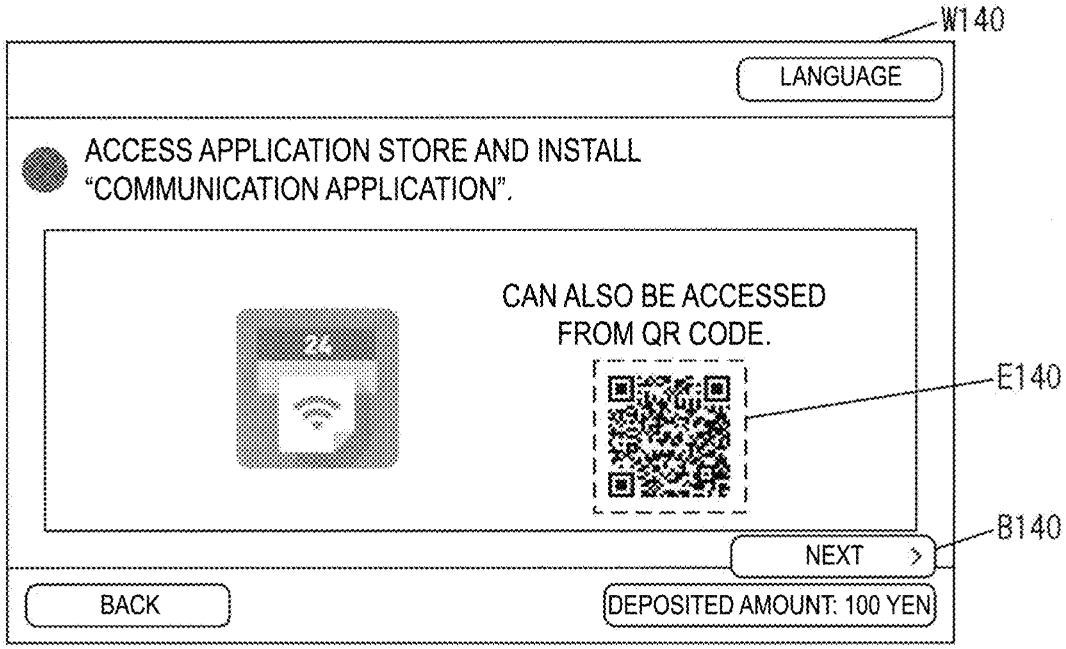
FIG. 9 is a diagram illustrating an operation example of the first embodiment.

FIG. 9 is a diagram illustrating an example of a screen W140 displayed when the button B130 or the button B132 is selected by the user on the screen W130. As illustrated in FIG. 9, the screen W140 includes a two-dimensional code E140 indicating the URL of the website where the communication application can be installed, as the guide display for the website.

The screen W140 further includes a button B140 for commanding displaying of the next screen. When the installation of the communication application is completed, by selecting the button B140, the user can input to the image forming apparatus 10, the fact that the communication application is installed in the terminal apparatus 20, and display the next screen.

Figure 10A:
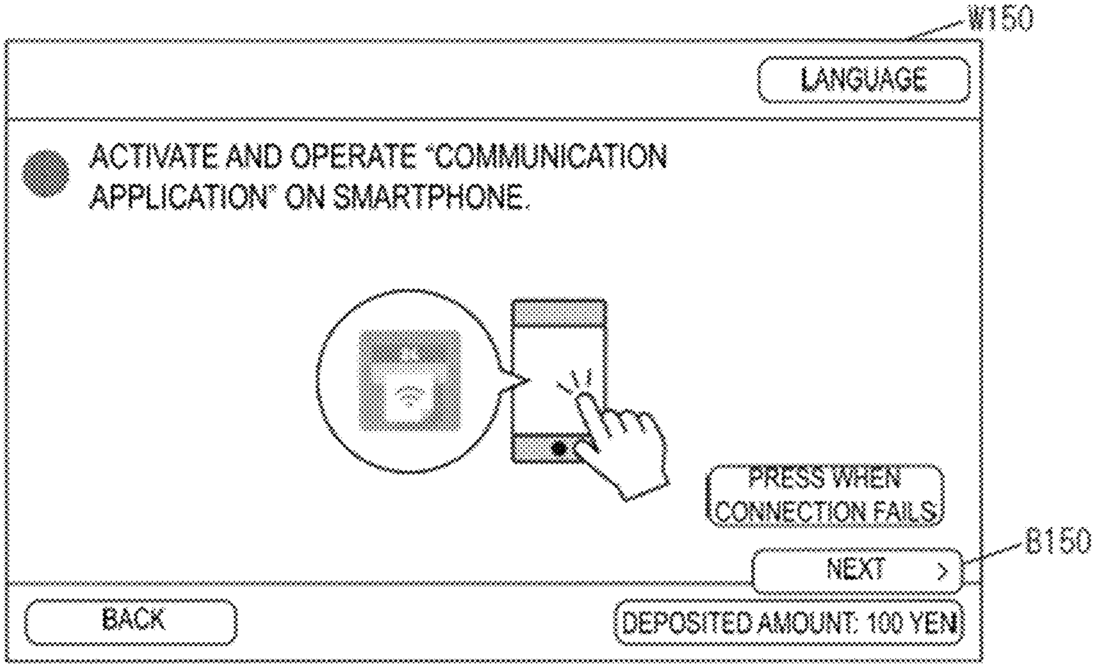
FIG. 10A is a diagram illustrating an operation example of the first embodiment.

When the button B140 is selected, a screen W150 illustrated in FIG. 10A is displayed to prompt the user to activate the communication application. By checking the screen W150, the user can activate the communication application on the terminal apparatus 20. Further, the user can display the next screen by selecting a button B150 for commanding displaying of the next screen.

Figure 10B:
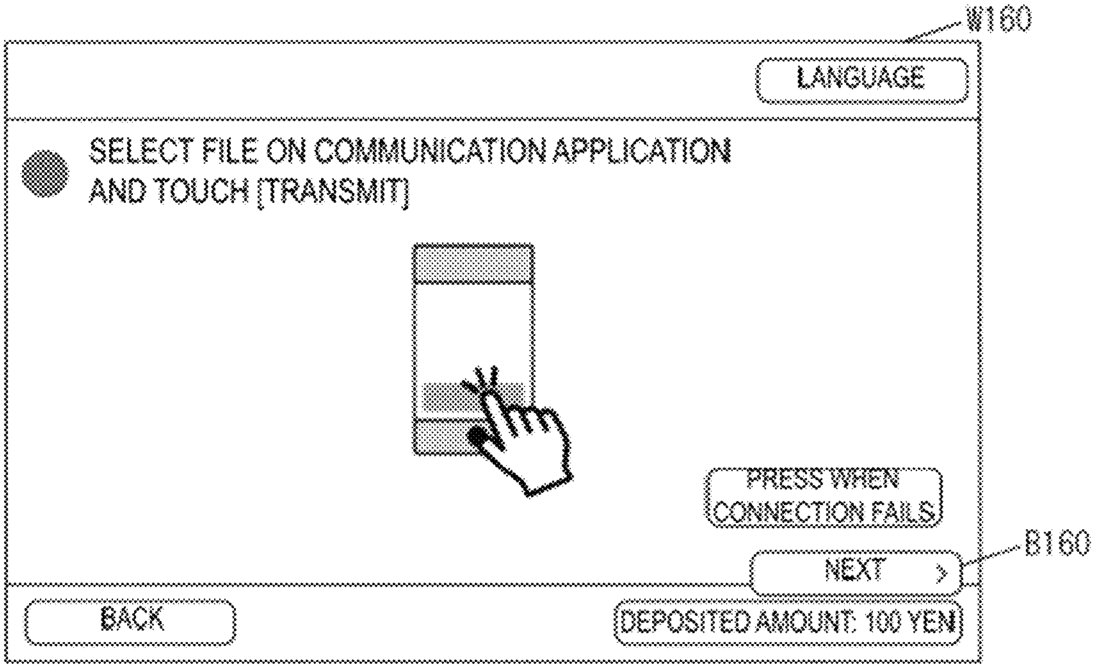
FIG. 10B is a diagram illustrating an operation example of the first embodiment.

When the button B150 is selected, a screen W160 is displayed that includes a description on the operation on the communication application illustrated in FIG. 10B. By checking the screen W160, the user can understand the operation on the communication application. The screen W160 may further include a button B160 for commanding advancement to the next. In this case, when the user selects the button B160, the communications are performed between the image forming apparatus 10 and the terminal apparatus 20. Thus, for example, the image forming apparatus 10 receives a content from the terminal apparatus 20.

Figure 11A:
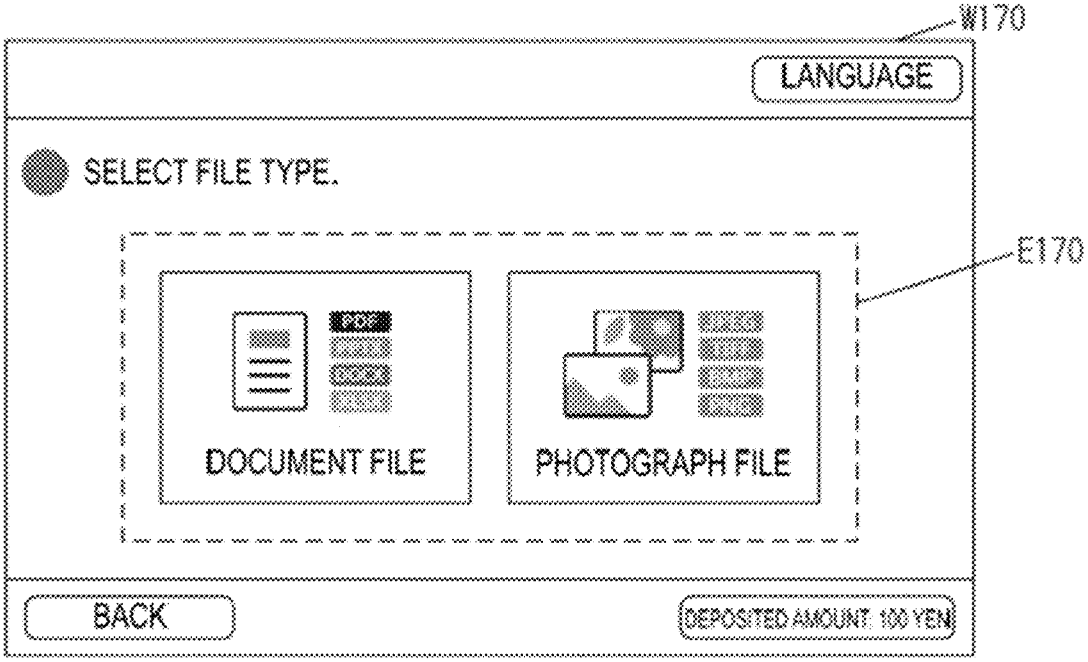
FIG. 11A is a diagram illustrating an operation example of the first embodiment.

FIG. 11A is a diagram illustrating an example of a service screen W170 displayed when the button B102 is selected on the portal screen W100. The user can set the format of the content to be printed by selecting any one of the buttons included in an area E170 of the service screen W170.

Figure 11B:
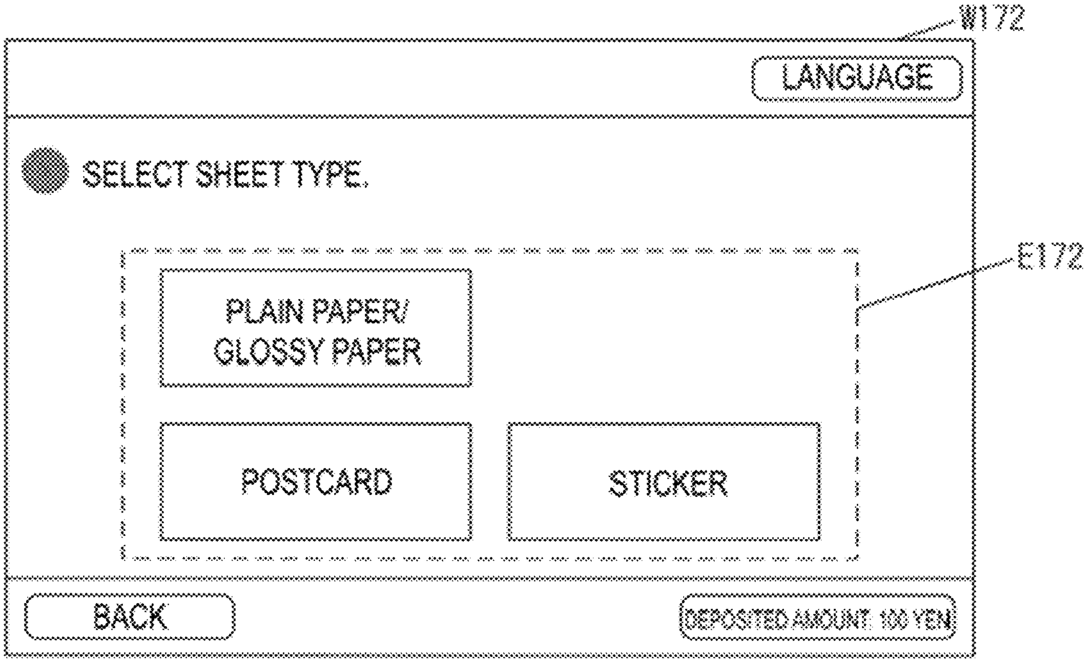
FIG. 11B is a diagram illustrating an operation example of the first embodiment.

FIG. 11B is a diagram illustrating an example of a service screen W172 displayed when any one of the buttons included in the area E170 of the service screen W170 is selected. By selecting any one of the buttons included in an area E172 of the service screen W172, the user can set the type of a sheet on which the image of the content is printed.

Figure 12:
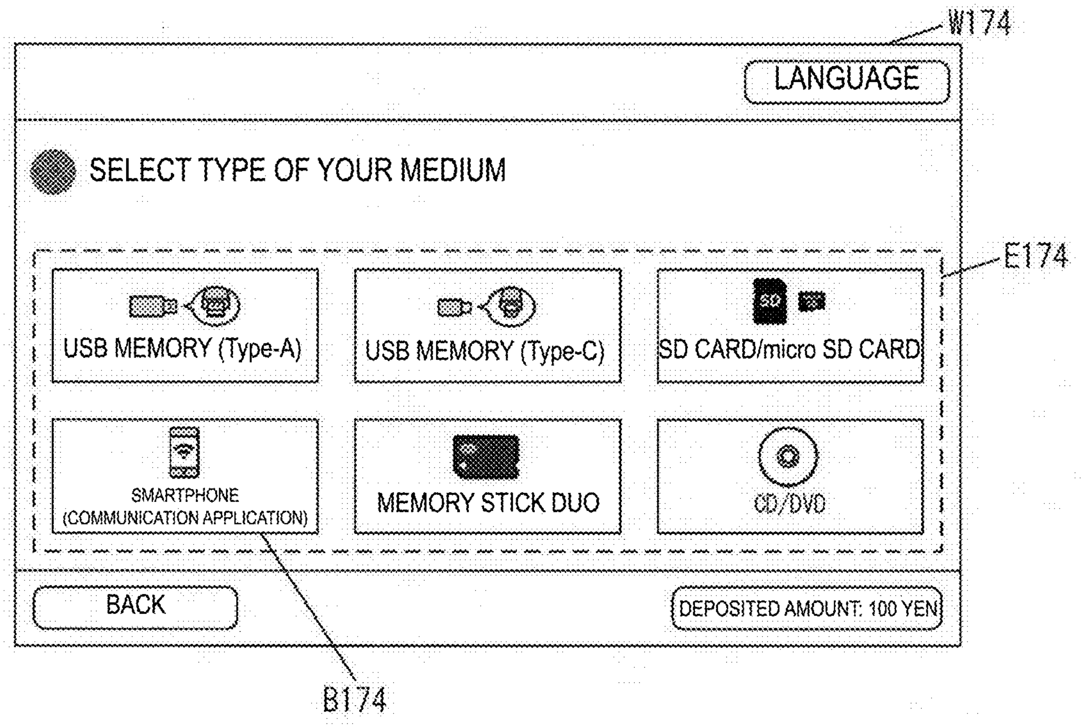
FIG. 12 is a diagram illustrating an operation example of the first embodiment.

FIG. 12 is a diagram illustrating an example of a service screen W174 displayed when any of the buttons included in the area E172 of the service screen W172 is selected. By selecting any one of the buttons included in an area E174 of the service screen W174, the user can set the type of the medium storing the content to be printed.

Here, the area E174 includes a button B174 for commanding acquisition of a content from the smartphone. When the user selects the button B174, all settings in the image forming apparatus 10 are completed, and the confirmation screen W120 illustrated in FIG. 8A is displayed.

Figure 13:
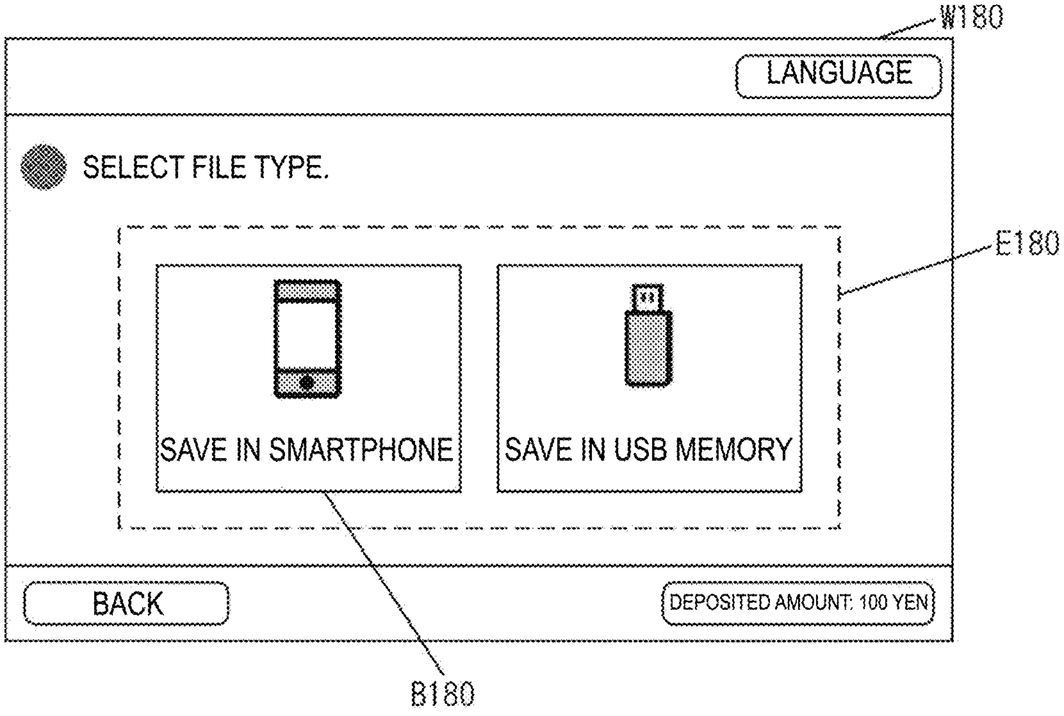
FIG. 13 is a diagram illustrating an operation example of the first embodiment.

FIG. 13 is a diagram illustrating an example of a service screen W180 displayed when the button B104 is selected on the portal screen W100. The user can set the storage destination of scan data by selecting any one of the buttons included in an area E180 of the service screen W180.

The area E180 includes a button B180 for commanding the smartphone to store the scan data. When the user selects the button B180, all settings in the image forming apparatus 10 are completed, and the confirmation screen W120 illustrated in FIG. 8A is displayed.

Figure 14A:
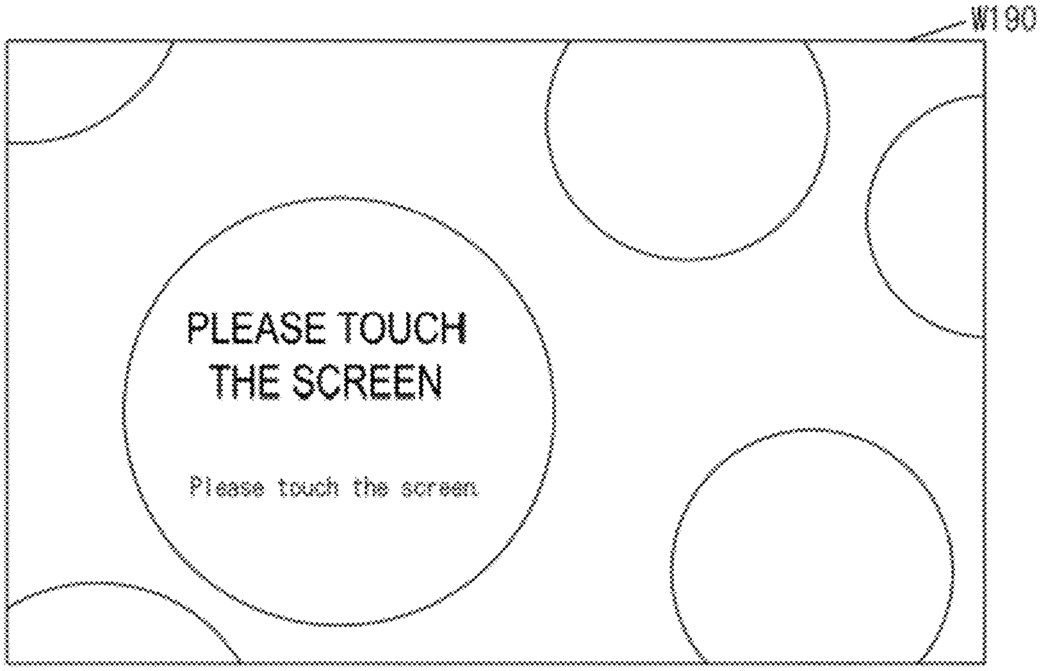
FIG. 14A is a diagram illustrating an operation example of the first embodiment.

FIG. 14A is a diagram illustrating an example of a screen saver screen W190. The user can input an operation using the operation inputter 150 while the screen saver screen W190 is being displayed, to display the portal screen W100. The user can cause the acquirer 180 to read the two-dimensional code while the screen saver screen W190 is being displayed, to display a service screen based on the information read from the two-dimensional code.

Figure 14B:
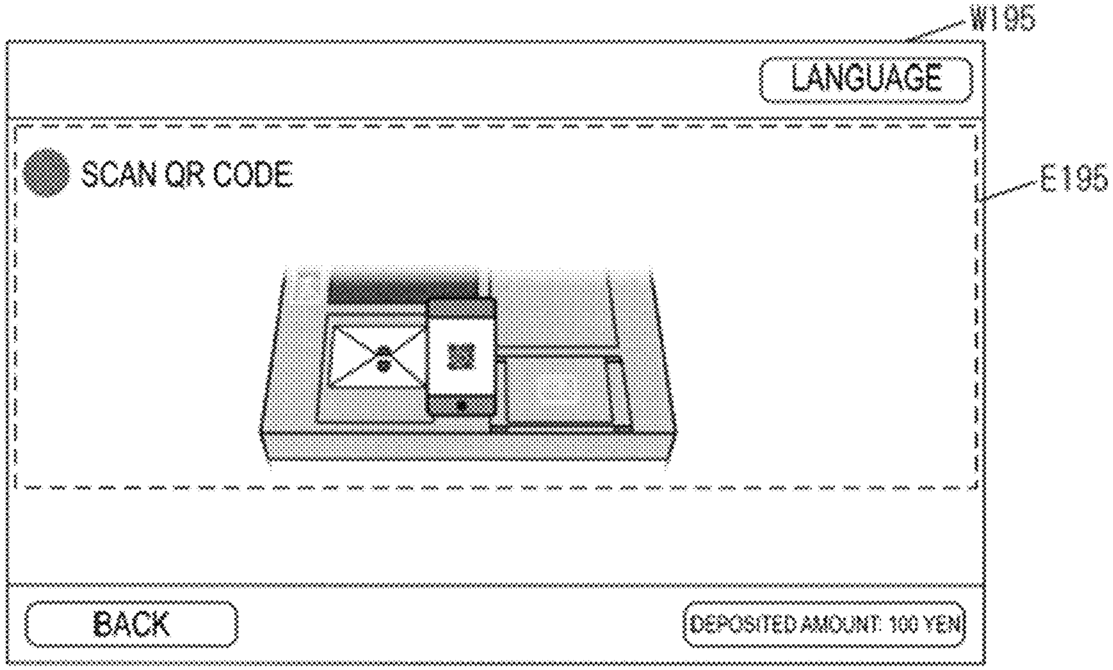
FIG. 14B is a diagram illustrating an operation example of the first embodiment.

FIG. 14B is a diagram illustrating an example of a screen W195 displayed when the button B106 is selected on the portal screen W100. The screen W195 includes an area E195 including a guide prompting the user to hold the two-dimensional code displayed on the terminal apparatus 20 over the acquirer 180. By checking the screen W195, the user can recognize that he or she has to perform the operation of holding the two-dimensional code displayed on the terminal apparatus 20 over the acquirer 180. When the two-dimensional code is read by the acquirer 180, a trigger is acquired by the image forming apparatus 10, and a service screen corresponding to the trigger is displayed on the display 140.

Figure 15A:
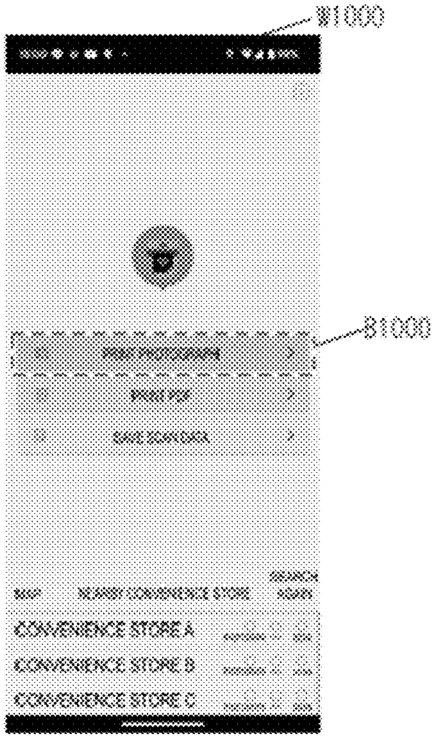
FIG. 15A is a diagram illustrating an operation example of the first embodiment.

FIGS. 15A to 17C are diagrams illustrating examples of a screen displayed on the display 240. FIG. 15A is a diagram illustrating an example of a screen W1000 for selecting a service. For example, the user can use a photo print service by selecting, on the screen W1000, a button B1000 indicating that the photo print service is to be used.

Figure 15B:
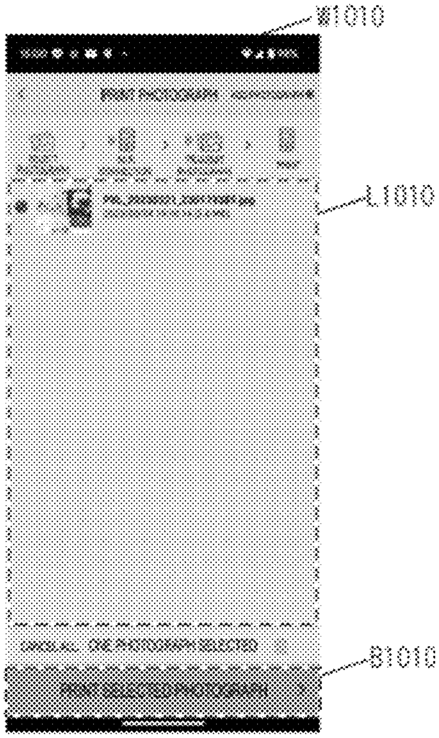
FIG. 15B is a diagram illustrating an operation example of the first embodiment.

FIG. 15B is an example of a screen W1010 displayed when the button B1000 is selected. The screen W1010 is a screen for selecting a content to be transmitted to the image forming apparatus 10, and includes: an area L1010 for displaying, in a selectable manner, a list of contents stored in the content storage area 264; and a button B1010 for commanding printing of the content selected in the area L1010.

Figure 15C:
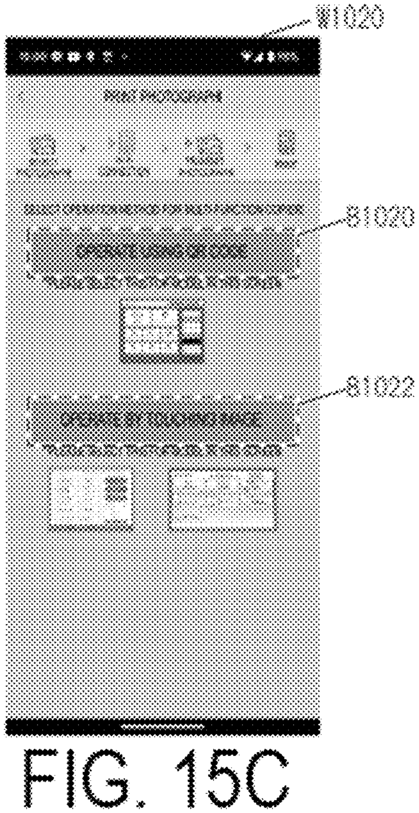
FIG. 15C is a diagram illustrating an operation example of the first embodiment.

FIG. 15C is a diagram illustrating an example of a screen W1020 displayed when the button B1010 is selected. The screen W1020 includes a button B1020 for commanding displaying of the QR code, and a button B1022 for commanding an operation on the image forming apparatus 10.

Figure 15D:
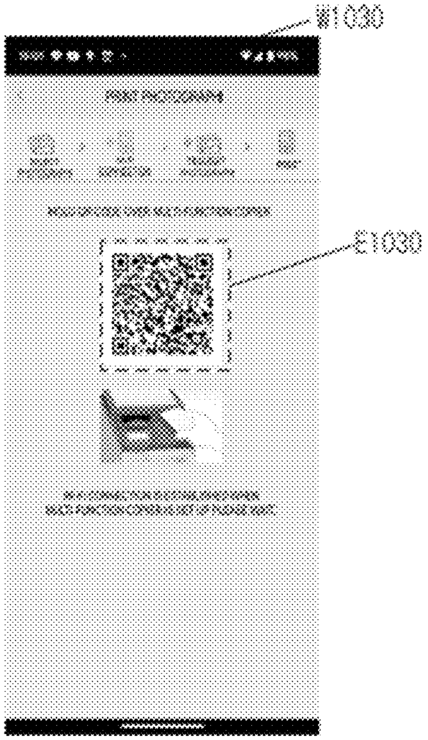
FIG. 15D is a diagram illustrating an operation example of the first embodiment.

FIG. 15D is a diagram illustrating an example of a screen W1030 displayed when the button B1020 is selected. The screen W1030 includes an area E1030 in which a QR code is displayed. The QR code includes, for example, information indicating the use of a print service. Thus, the trigger is output with the QR code displayed on the display 240 in the terminal apparatus 20.

Figure 16A:
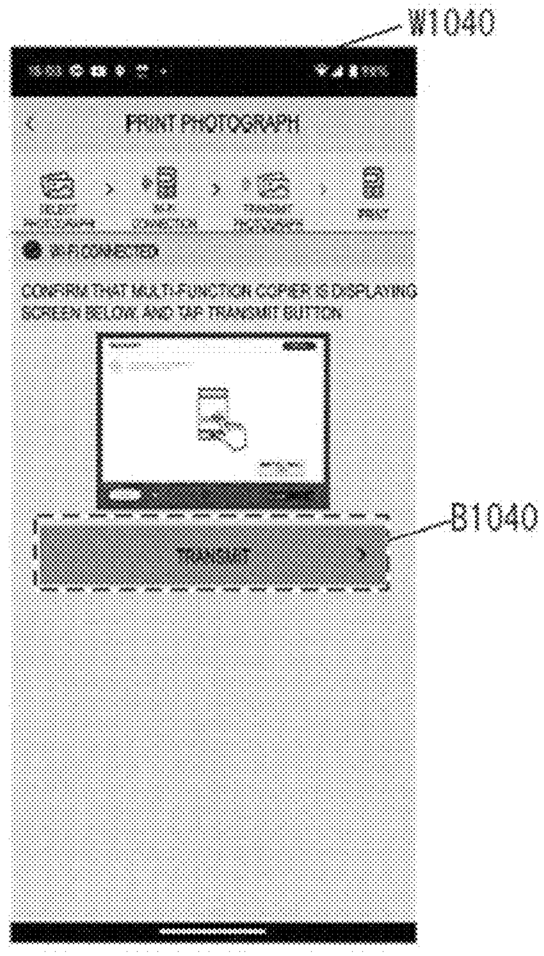
FIG. 16A is a diagram illustrating an operation example of the first embodiment.
Figure 16B:
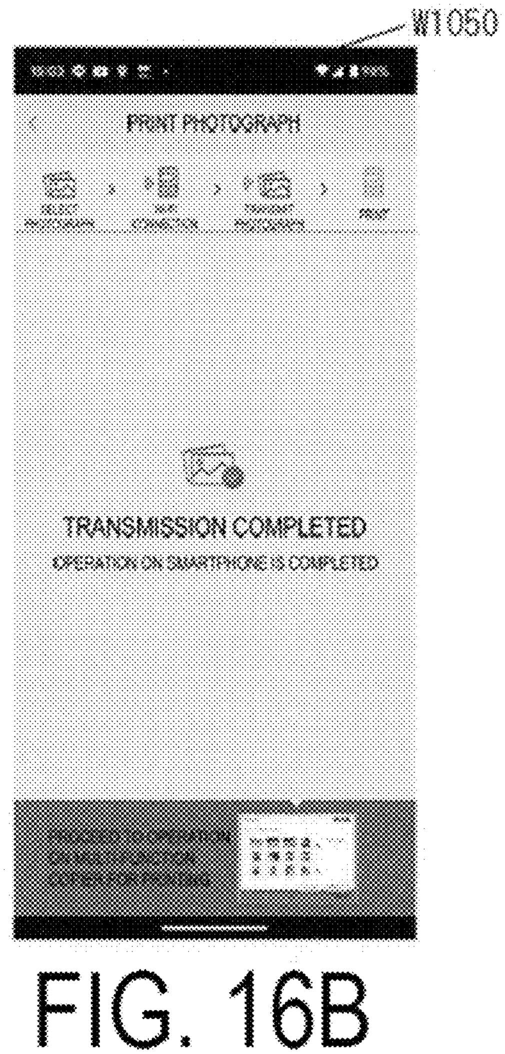
FIG. 16B is a diagram illustrating an operation example of the first embodiment.

FIG. 16A is a diagram illustrating an example of a screen W1040 commanding transmission of the content selected on the screen W1010 to the image forming apparatus 10. By selecting a button B1040 for commanding start of the transmission of the content, the user can transmit the content to the image forming apparatus 10. When the transmission of the content is completed, a screen W1050 illustrated in FIG. 16B is displayed to indicate that the transmission of the content is completed.

Figure 17A:
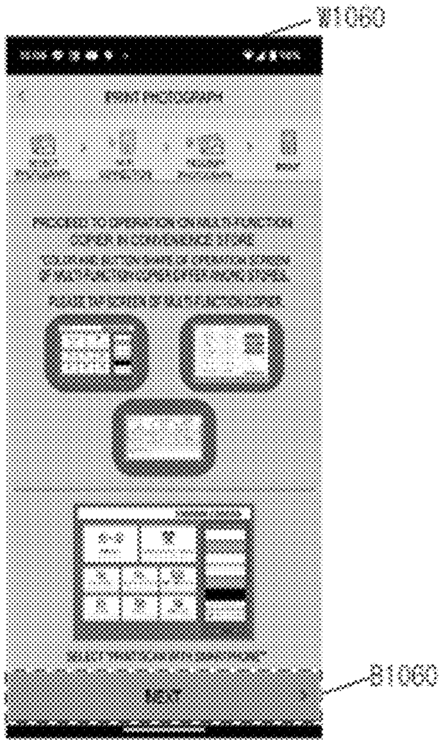
FIG. 17A is a diagram illustrating an operation example of the first embodiment.

FIG. 17A is a diagram illustrating an example of a screen W1060 displayed when the button B1022 is selected on the screen W1020. On the screen W1060, for example, a guide for an operation performed by the user on the image forming apparatus 10 is displayed. The user can display the next screen by selecting a button B1060 for commanding the displaying of the next screen.

Figure 17B:
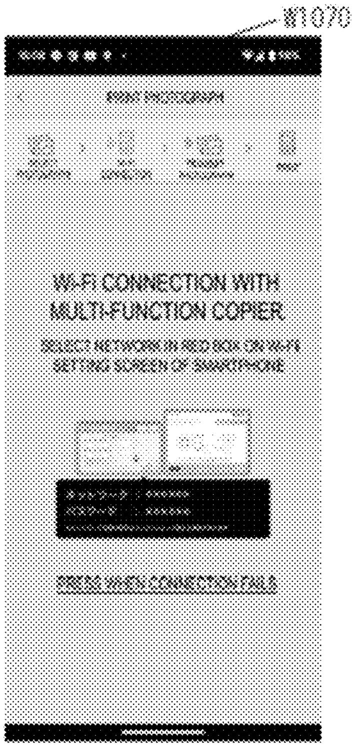
FIG. 17B is a diagram illustrating an operation example of the first embodiment.

When the button B1060 is selected, for example, a screen W1070 illustrated in FIG. 17B is displayed. On the screen W1070, a guide for connecting the image forming apparatus 10 and the terminal apparatus 20 to each other is displayed. Referring to the screen W1070, the user connects the image forming apparatus 10 and the terminal apparatus 20 to each other.

Figure 17C:
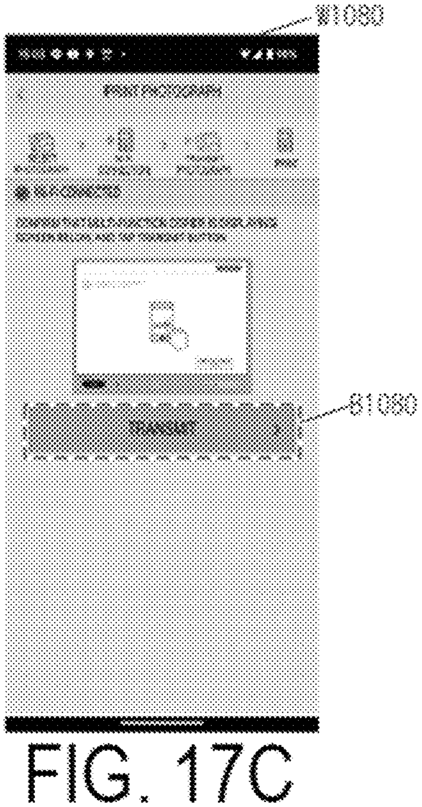
FIG. 17C is a diagram illustrating an operation example of the first embodiment.

After the image forming apparatus 10 and the terminal apparatus 20 are connected to each other, a screen W1080 illustrated in FIG. 17C is displayed. The screen W1080 is a screen for commanding transmission of the content selected on the screen W1010 to the image forming apparatus 10. The user can transmit the selected content to the image forming apparatus 10 by selecting a button B1080 commanding start of the transmission of the content.

While the image forming apparatus 10 acquires a QR code as the trigger from the terminal apparatus 20 in the description above, the image forming apparatus 10 may acquire anything that serves as a trigger. For example, the image forming apparatus 10 may acquire a two-dimensional code such as MaxiCode or PDF417, or may acquire a one-dimensional code such as a barcode. The trigger may be information transmitted from the terminal apparatus 20 using near field communication (NFC). In this case, the image forming apparatus 10 may include an antenna or the like to perform near field communications as the acquirer 180.

In the above description, the processing of establishing connection between the image forming apparatus 10 and the terminal apparatus 20 is performed immediately before the communications with the terminal apparatus start. Alternatively, the processing of establishing the connection between the image forming apparatus 10 and the terminal apparatus 20 may be performed at any appropriate timing. For example, the controller 100 may establish the connection with the terminal apparatus 20 at the timing when the trigger is acquired by the acquirer 180, or the controller 200 may establish the connection with the image forming apparatus 10 at the timing when the trigger is output.

As described above, the method of setting and executing a service in the image forming apparatus according to the present embodiment includes: a first method of setting a service by operating an operation screen displayed on the display; and a second method of partially setting a service by reading a two-dimensional code. Thus, the user can use any one of the two methods as the method of starting the setting related to a service or a job.

When the service is started by the first method of setting the service by operating the operation screen displayed on the display of the image forming apparatus according to the present embodiment, the confirmation screen is displayed that is related to the installation of the communication application in the terminal apparatus during the setting. As a result, the image forming apparatus can make the user proceed with the operation while feeing a sense of security.

On the other hand, when the service is started by the second method in which the service is partially set by reading the two-dimensional code, the displaying of the confirmation screen is omitted in the image forming apparatus of the present embodiment, because the communication application is obviously already installed in the terminal apparatus. Thus, deterioration of usability is suppressed. As described above, the image forming apparatus according to the present embodiment appropriately controls the displaying of the confirmation screen depending on whether the communication application is installed in the terminal apparatus.

As described above, according to the image forming apparatus according to the present embodiment, whether the communication application is installed in the terminal apparatus is checked at an appropriate timing, and in a case where the communication application is not installed, the guide for the installation of the communication application and the guide for the operation are displayed. Thus, with the image forming apparatus according to the present embodiment, the usability of the user can be improved.

2. Second Embodiment

A second embodiment is an embodiment in which the confirmation screen of the first embodiment is displayed before the service starts. The present embodiment is obtained by replacing FIG. 5 in the first embodiment with FIG. 18. Note that the same processing is denoted by the same reference numeral, and description thereof is omitted.

2.1 Processing Flow

Figure 18:
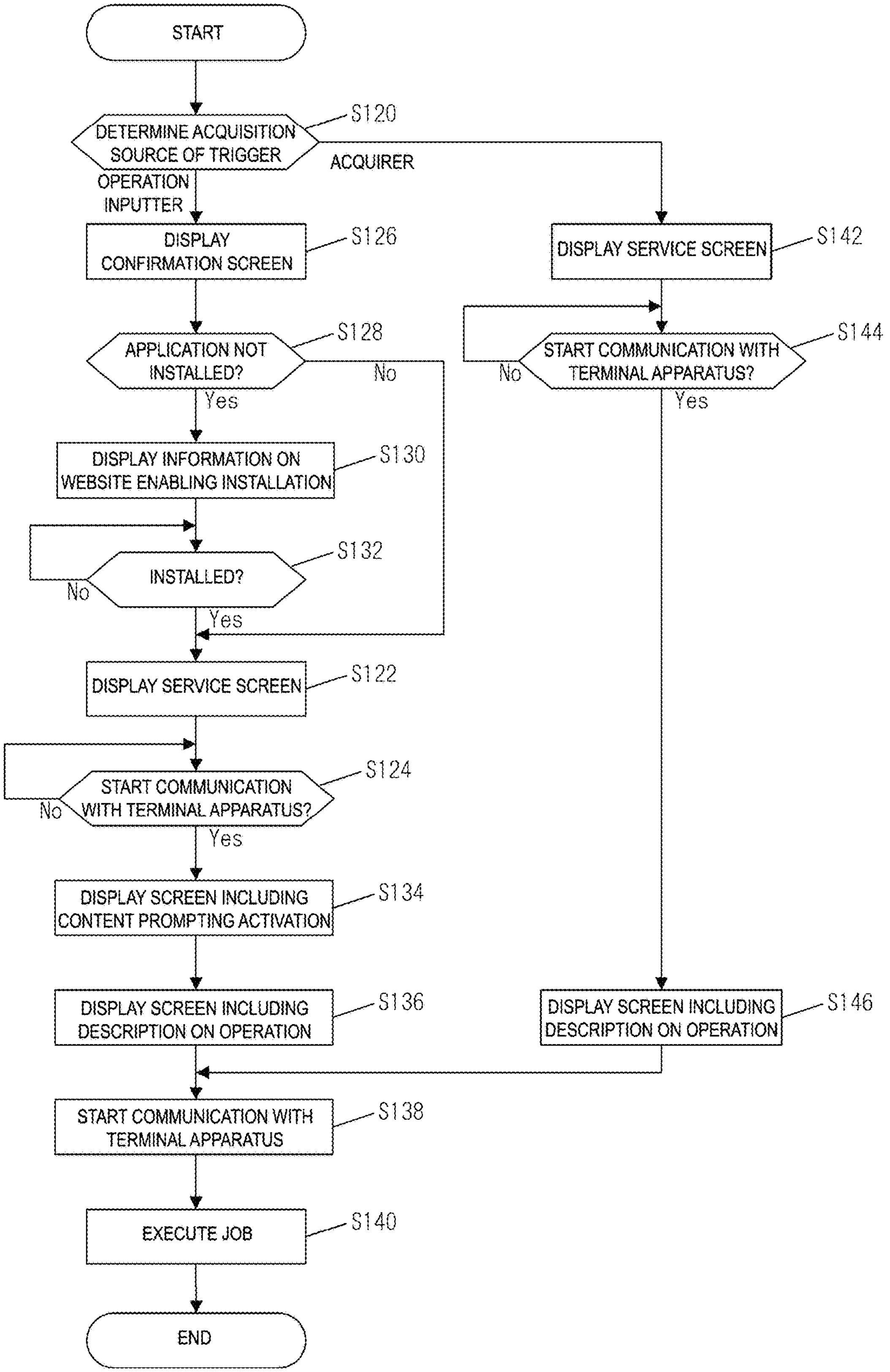
FIG. 18 is a flowchart of service execution processing of a second embodiment.

The controller 100 of the present embodiment executes the processing illustrated in FIG. 18 as the service execution processing. In the present embodiment, in a case where the trigger is acquired from the operation inputter 150, the service executor 106 displays the confirmation screen in place of the service screen (step S126), and determines whether the communication application is installed in the terminal apparatus 20 (step S128).

Upon determining that the communication application is not installed in the terminal apparatus 20, the service executor 106 displays on the display 140, information on the website where the communication application can be installed (Yes in step S128, the processing proceeds to step S130). Upon determining that the communication application is installed in the terminal apparatus 20, the service executor 106 displays the service screen (Yes in step S132, the processing proceeds to step S122).

Upon determining in step S128 that the communication application is installed in the terminal apparatus 20, the service executor 106 omits the processing in step S130 and step S132 and displays the service screen (No in step S128, the processing proceeds to step S122).

Thus, the service executor 106 can display the confirmation screen on the display 140 before executing the service.

2.2 Operation Example

Figure 19:
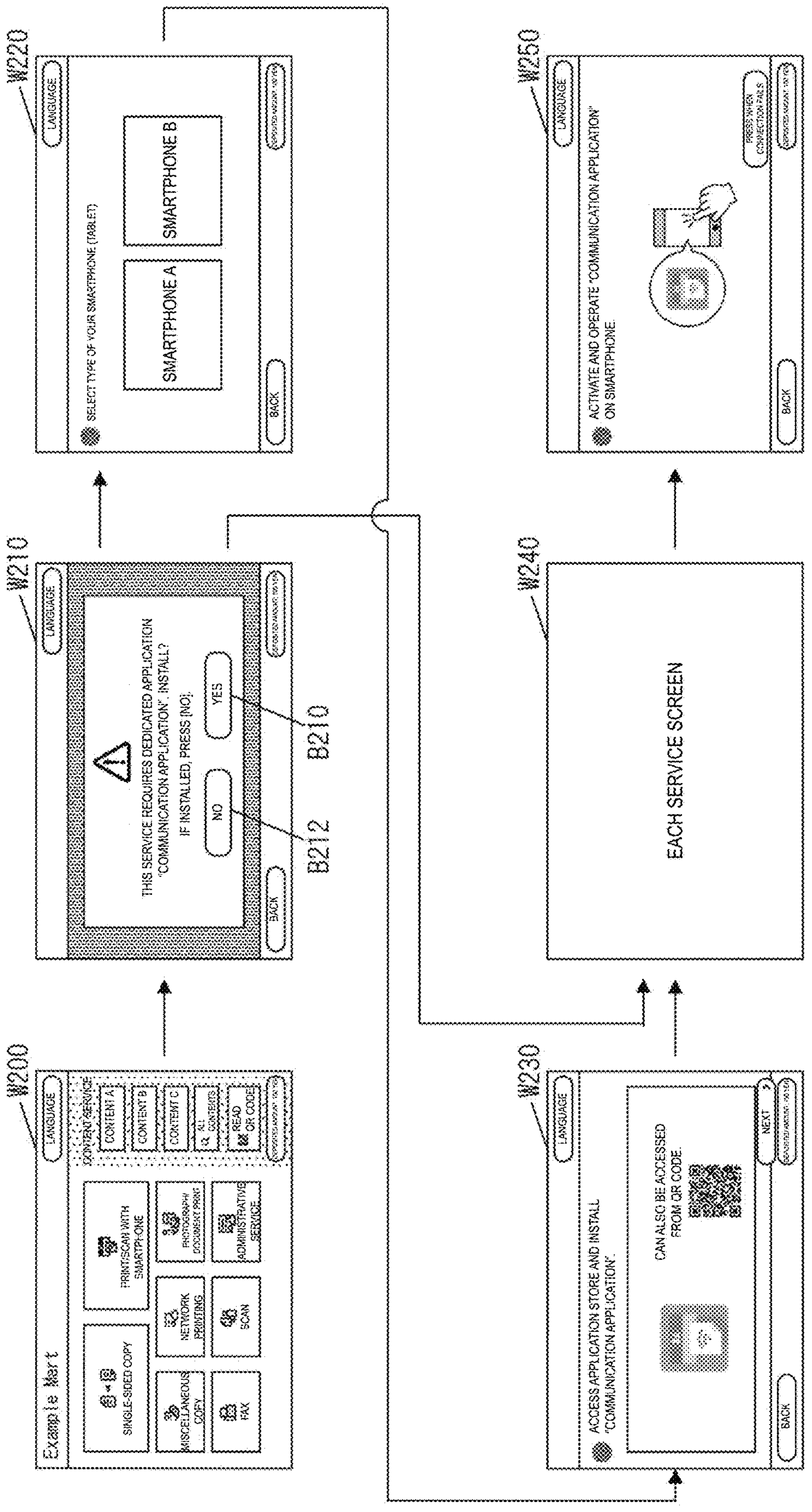
FIG. 19 is a diagram illustrating an operation example of the second embodiment.

FIG. 19 is a diagram illustrating transition of screens displayed on the display 140 in the present embodiment. First, a portal screen W200 is displayed, and when the user selects a service using the operation inputter 150, a confirmation screen W210 is displayed. The confirmation screen W210 includes a button B210 for commanding installation of the communication application for the terminal apparatus in which the communication application is not installed, and a button B212 for commanding that the communication application not be installed because the communication application is already installed in the terminal apparatus 20.

When the user selects the button B210, a screen W220 for making the user select the type of his or her smartphone is displayed. When the user selects the type of the smartphone, a screen W230 including the two-dimensional code indicating the URL of the website where the communication application can be installed is displayed as the guide display for the website. Thus, the user can install the communication application.

When the completion of the installation of the communication application is input to the image forming apparatus 10 by the user, a service screen W240 corresponding to the service selected on the portal screen W200 is displayed. When a predetermined operation is performed on the service screen W240, a screen W250 for prompting the user to activate the communication application is displayed.

On the other hand, when the button B212 is selected by the user on the confirmation screen W210, the service screen W240 corresponding to the service selected on the portal screen W200 is displayed.

As described above, the image forming apparatus according to the present embodiment displays the guide screen before the start of the execution of the service, thereby enabling the user to recognize that the installation of the communication application in the terminal apparatus is necessary for the execution of the service, before the execution of the service.

3. Third Embodiment

A third embodiment is an embodiment in which, in the first embodiment, the screen (first guide screen) indicating that a trigger is to be acquired via the acquirer 180 includes a content for confirming whether a communication application is installed. The present embodiment is obtained by replacing FIG. 4 in the first embodiment with FIG. 20. Note that the same processing is denoted by the same reference numeral, and description thereof is omitted.

3.1 Processing Flow

Figure 20:
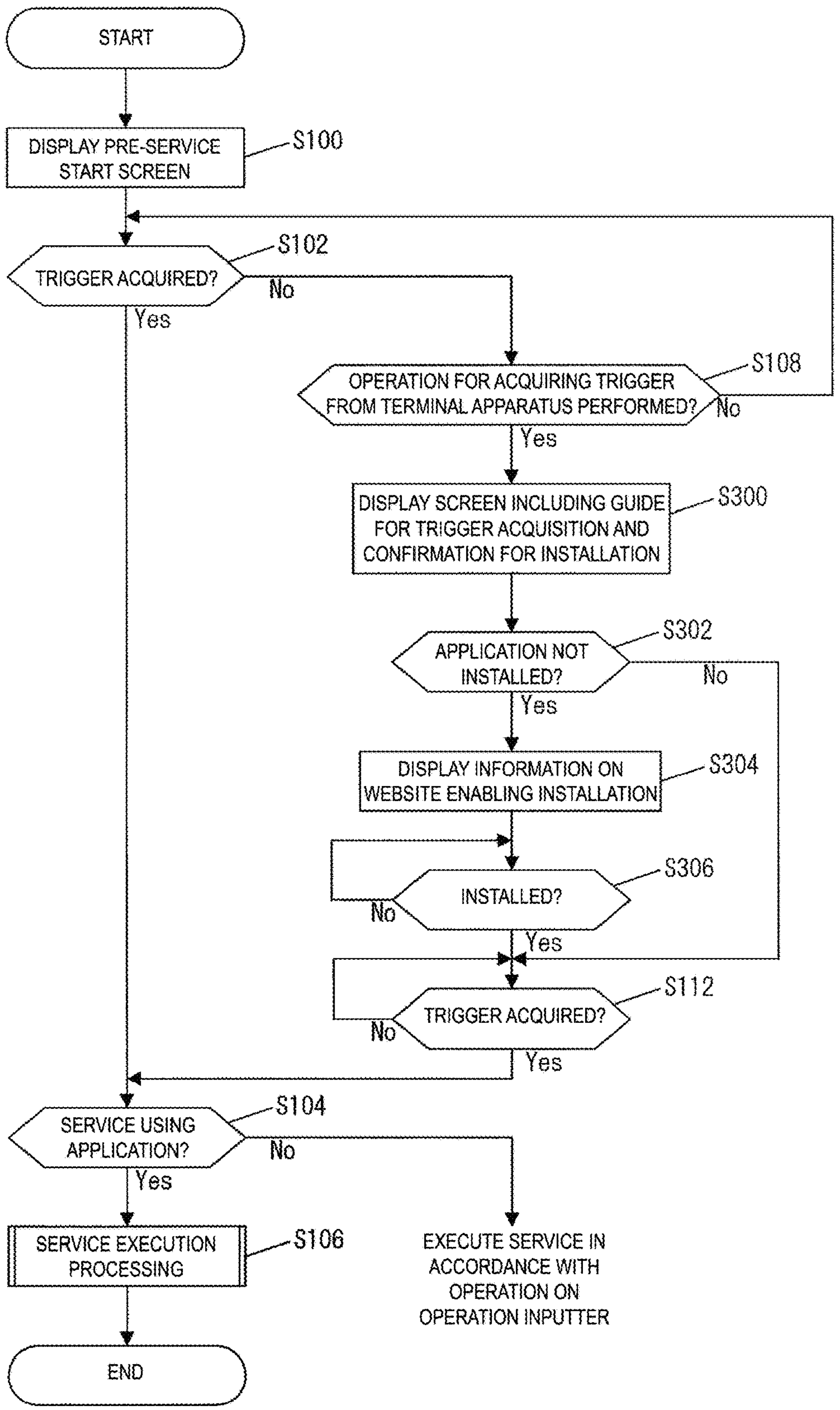
FIG. 20 is a flowchart illustrating main processing by an image forming apparatus of a third embodiment.

The controller 100 of the present embodiment executes the processing illustrated in FIG. 20 as the main processing. In the present embodiment, when an operation for acquiring a trigger from another apparatus such as the terminal apparatus 20 is performed on the portal screen by the user, the controller 100 displays a screen including a guide for acquiring a trigger and a content for confirming whether the communication application is installed in the terminal apparatus 20 using the acquirer 180 (Yes in step S108, the processing proceeds to step S300). Specifically, the controller 100 displays the first guide screen of the first embodiment including the content for confirming whether the communication application is installed in the terminal apparatus 20.

Upon determining that the communication application is not installed in the terminal apparatus 20, the controller 100 displays on the display 140, information on a website where the communication application can be installed (Yes in step S302, the processing proceeds to step S304).

The controller 100 determines whether the communication application is installed in the terminal apparatus 20 (step S306). Upon determining that the communication application is not installed in the terminal apparatus 20 (No in step S306), the controller 100 repeats the processing in step S306.

Upon determining that the communication application is installed in the terminal apparatus 20 (Yes in step S306), the controller 100 executes the processing in step S112, step S104, and step S106. Upon determining in step S302 that the communication application is installed in the terminal apparatus 20 (No in step S302), the controller 100 omits the processing in step S304 and step S306.

3.2 Operation Examples

Figure 21:
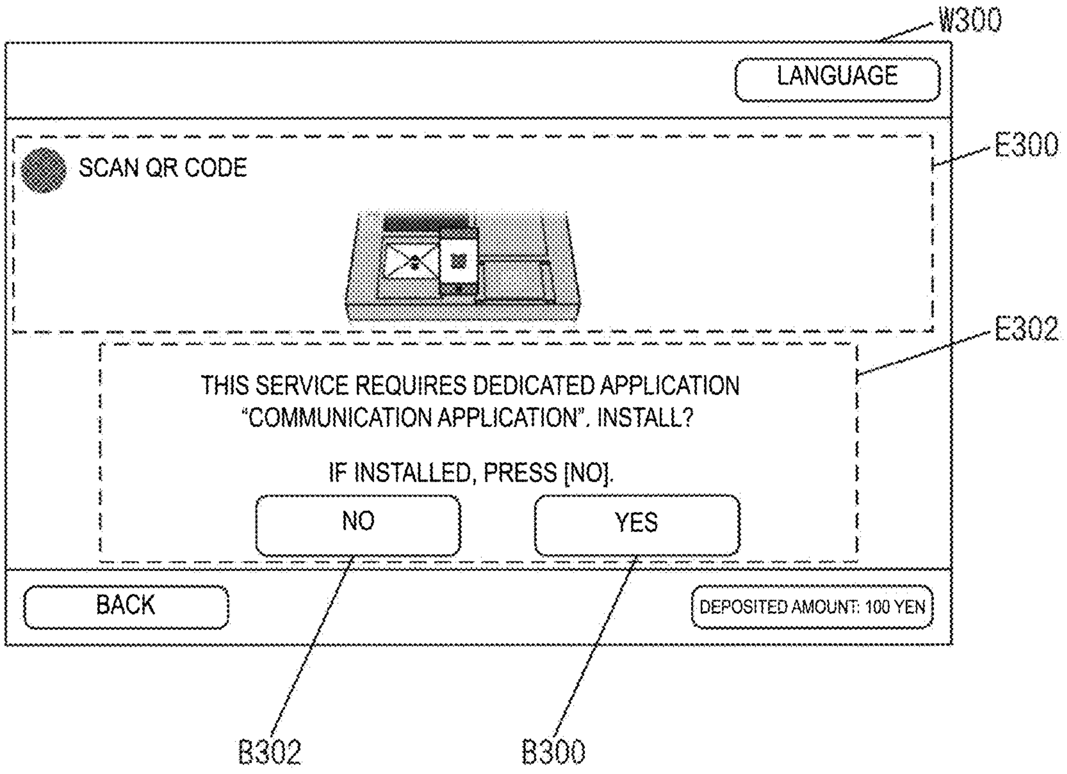
FIG. 21 is a diagram illustrating an operation example of the third embodiment.

FIG. 21 is a diagram illustrating an example of a screen W300 displayed on the display 140 of the image forming apparatus 10 according to the present embodiment when the button B106 is selected on the portal screen W100 illustrated in FIG. 7A of the first embodiment.

The screen W300 includes an area E300 that displays a guide prompting the user to hold the two-dimensional code displayed on the terminal apparatus 20 over the acquirer 180, as the content indicating that the trigger is to be acquired. Further, the screen W300 includes an area E302 displaying the content for confirming whether the communication application is installed in the terminal apparatus 20.

The screen W300 includes the button B300 for commanding installation of the communication application for the terminal apparatus 20 in which the communication application is not installed, and a button B302 for commanding that the communication application not be installed because the communication application is already installed in the terminal apparatus 20.

When the button B300 is selected by the user, the screen W130 illustrated in FIG. 8B of the first embodiment or the screen W140 illustrated in FIG. 9 of the first embodiment is displayed as the guide related to the communication application. In this case, after the button B140 on the screen W140 is selected by the user, the service screen is displayed. On the other hand, when the button B302 is selected by the user, the service screen is displayed without displaying the guide screen related to the communication application.

As described above, when an operation for acquiring a trigger from another apparatus is performed, since whether the communication application is installed in the other apparatus is unknown, the image forming apparatus according to the present embodiment displays a screen for guiding acquisition of a trigger including the content for confirming whether the communication application is installed. Thus, the image forming apparatus according to the present embodiment allows the user to recognize that the communication application is required, and when the communication application is not installed, the guide for the installation of the communication application can be displayed.

4. Fourth Embodiment

A fourth embodiment is an embodiment in which the content included in the screen displayed on the display 140 varies in accordance with the trigger acquisition method in the first embodiment. In the present embodiment, FIG. 4 of the first embodiment is replaced with FIG. 22, and FIG. 5 of the first embodiment is replaced with FIG. 23. Note that the same processing is denoted by the same reference numeral, and description thereof is omitted.

4.1 Processing Flow 4.1.1 Main Processing

Figure 22:
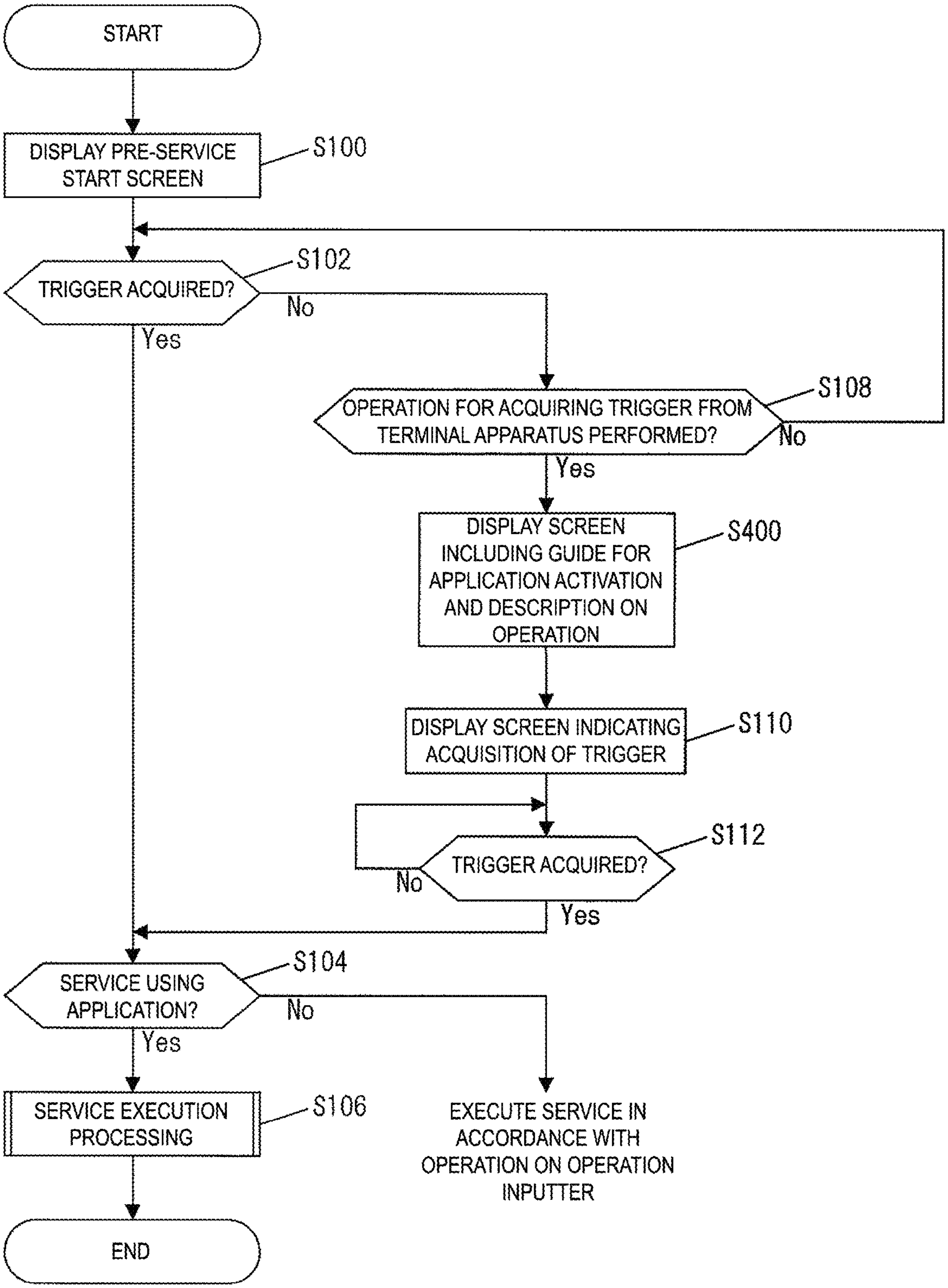
FIG. 22 is a flowchart illustrating main processing by an image forming apparatus of a fourth embodiment.

The controller 100 of the present embodiment executes the processing illustrated in FIG. 22 as the main processing. In the present embodiment, upon determining that an operation for acquiring a trigger from another apparatus is performed by the user, the controller 100 displays a screen including a guide for activation of the communication application and a description on the operation on the communication application (Yes in step S108, the processing proceeds to step S400). When the user performs an operation for displaying the next screen or when a predetermined period of time elapses, the controller 100 executes the processing in step S110 and after.

4.1.2 Service Execution Processing

Figure 23:
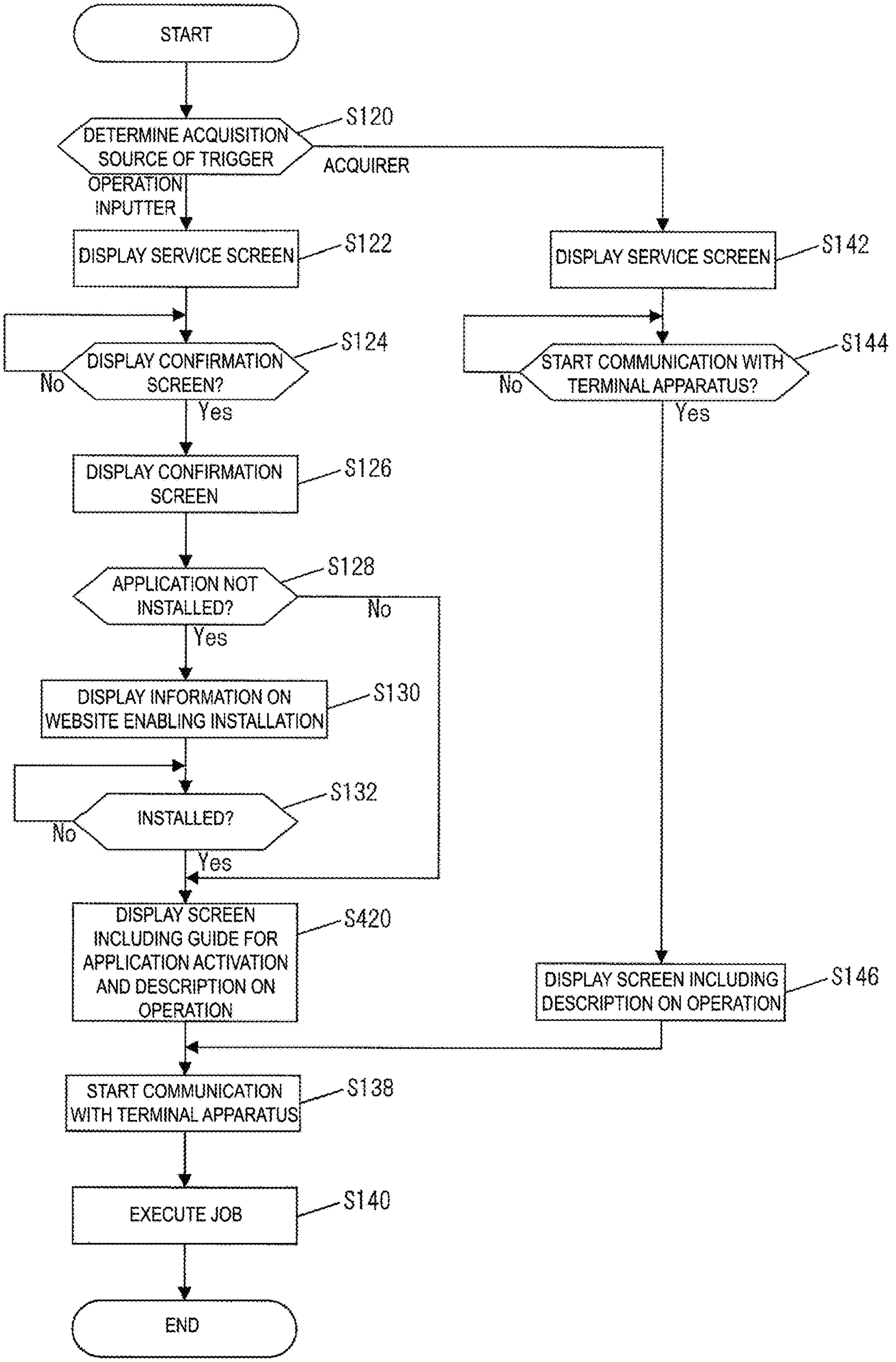
FIG. 23 is a flowchart of service execution processing of the fourth embodiment.

The controller 100 of the present embodiment executes the processing illustrated in FIG. 23 as the service execution processing. In the present embodiment, after the communication application is installed in the terminal apparatus 20, the service executor 106 displays a screen including a guide (first display content) for prompting the user to activate the communication application and a description (second display content) on an operation on the communication application (Yes in step S132, the processing proceeds to step S420).

Also upon determining in step S128 that the communication application is installed in the terminal apparatus 20, the service executor 106 displays the screen including the first display content and the second display content (No in step S128, the processing proceeds to step S420).

As described above, the service executor 106 displays the second guide screen, described in the first embodiment, including the first display content for prompting the user to activate the communication application, as well as the second display content describing the operation on the communication application.

On the other hand, upon determining that the trigger is acquired from the acquirer 180, the service executor 106 displays a screen (third guide screen) including only the description (second display content) on the operation on the communication application in step S146.

4.2 Operation Example

Figure 24A:
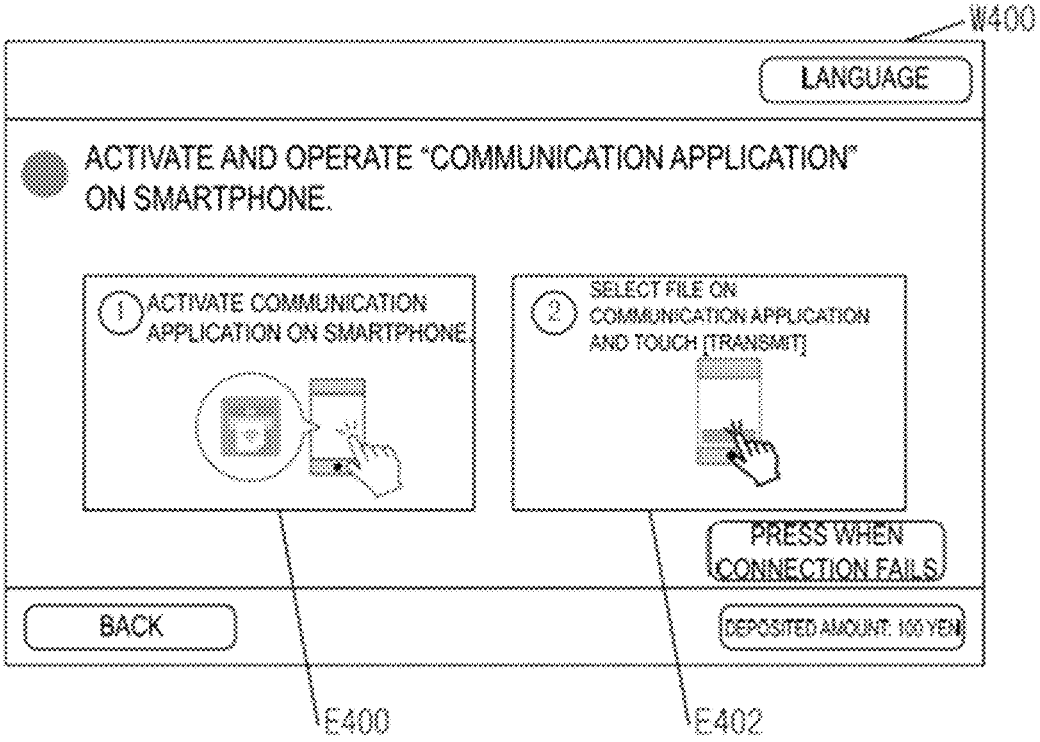
FIG. 24A is a diagram illustrating an operation example of the fourth embodiment.

FIG. 24 is a diagram illustrating an example of a screen displayed on the display 140 in the present embodiment. FIG. 24A is a diagram illustrating an example of a second guide screen W400 including the first display content and the second display content. The second guide screen W400 includes a guide E400 that is the first display content for prompting the user to activate the communication application as the first display content and a guide E402 that is the second display content describing the operation on the communication application. A screen similar to the second guide screen W400 is also displayed in step S400 in FIG. 22. Specifically, also when the operation of acquiring the trigger from the terminal apparatus 20 is performed, the communication application is activated, and thus the second guide screen W400 is displayed.

Figure 24B:
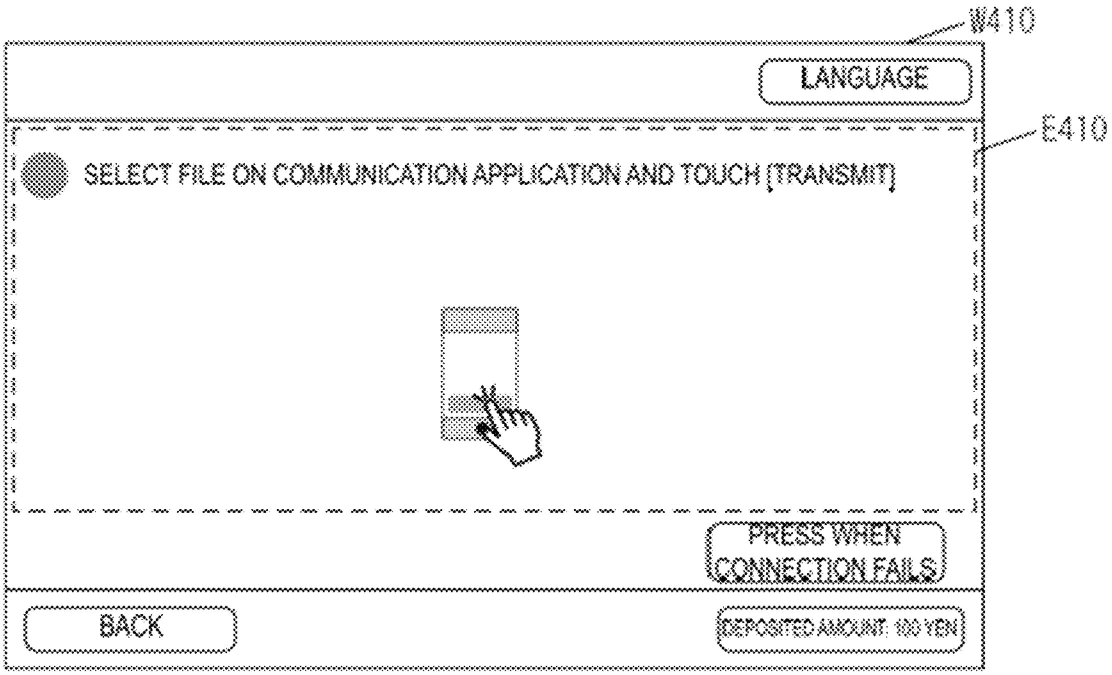
FIG. 24B is a diagram illustrating an operation example of the fourth embodiment.

FIG. 24B is a diagram illustrating an example of a third guide screen W410 including only a guide E410 that is the second display content describing the operation on the communication application. The third guide screen W410 is displayed when the trigger is acquired from the terminal apparatus 20 via the acquirer 180 without performing the operation for acquiring the trigger from the terminal apparatus 20. In this case, since the trigger is acquired from the terminal apparatus 20 via the acquirer 180, the communication application is obviously activated. Therefore, the guide for activation of the communication application is not displayed, and the screen including only the description on the operation on the communication application is displayed.

While the screen including the description is displayed in step S400 in FIG. 22 and step S146 in FIG. 23 in a case where the trigger is acquired from the terminal apparatus 20, the processing of displaying the screen including the description may be appropriately changed. For example, in a case where step S400 is executed before the job is executed, the controller 100 may omit the processing in step S146. In this way, it is possible to prevent the description on the operation on the communication application from being displayed twice.

In step S400, the controller 100 may display a screen including only a guide for activation of the communication application. Accordingly, the controller 100 can display an appropriate guide at each of the timing (step S400) at which the communication application needs to be activated and the timing (step S146) at which the communication application needs to be operated.

As described above, in a case where the trigger is acquired from the terminal apparatus and it is obvious that the communication application is activate based on the acquired timing, the image forming apparatus according to the present embodiment omits the displaying of the guide for activating the communication application. Thus, the image forming apparatus according to the present embodiment can display the guide related to the communication application at an appropriate timing.

5. Modified Example

The present disclosure is not limited to the embodiments described above and can be changed in various manners. In other words, embodiments obtained by combining technical mechanisms appropriately changed without departing from the gist of the present disclosure are also included in the technical scope of the present disclosure. While the technique of appropriately displaying the confirmation screen in the image forming apparatus has been described in the above embodiments, the technique may be applied to an apparatus (for example, an image reading apparatus) other than the image forming apparatus.

Although some parts of the above-described embodiments are described separately for convenience of explanation, it is a matter of course that combinations can be executed within a technically allowable range. For example, an image forming apparatus configured to be capable of setting the timing of displaying the confirmation screen may be obtained by combining the first embodiment and the second embodiment.

The programs running on each device in the embodiments are programs for controlling a CPU or the like (programs for causing a computer to function) to realize the aforementioned functions in the embodiments. The information handled by these devices is temporarily accumulated in a transitory storage device (for example, a RAM) at the time of processing, is then stored in a storage device such as a read only memory (ROM) or an HDD, and is read, corrected, and written by the CPU as needed.

The recording medium storing the programs may be any of a semiconductor medium (for example, a ROM, a non-volatile memory card, or the like), an optical recording medium or a magneto-optical recording medium (for example, a digital versatile disc (DVD), a magneto optical disc (MO), a mini disc (MD), a compact disc (CD), a Blu-ray (trade name) disc (BD) or the like), a magnetic recording medium (for example, a magnetic tape, a flexible disk, or the like), and the like. Not only the aforementioned functions of the embodiments are realized by executing the loaded programs, but also the functions of the present disclosure may be realized by performing processing in cooperation with an operating system, another application program, or the like based on commands of the programs.

In a case where the programs are distributed to the market, the programs can be stored and distributed in a portable recording medium, or can be transferred to a server computer connected via a network such as the Internet. In this case, it is a matter of course that the storage device of the server computer is also included in the present disclosure.

In addition, each functional block or various features of the apparatus used in the above-described embodiments may be implemented or executed by an electric circuit, for example, an integrated circuit or a plurality of integrated circuits. An electrical circuit designed to perform the functions described herein may include a general-purpose processor, a digital signal processor (DSP), an application specific integrated circuit (ASIC), a field programmable gate array (FPGA) or other programmable logic device, discrete gate or transistor logic, discrete hardware components, or a combination thereof. The general-purpose processor may be a microprocessor, or any known processor, controller, microcontroller, or state machine. The above-described electric circuit may be constituted by a digital circuit or an analog circuit. In addition, in a case where an integrated circuit technology that replaces the current integrated circuit becomes available due to advancement of the semiconductor technology, one or more aspects of the present disclosure can use a new integrated circuit based on the new integrated circuit technology. For example, according to the image forming apparatus 10 of the disclosure, some or all of the processors included in the controller 100 may be constituted by an electronic circuit.

What is claimed is:

1. An image forming apparatus comprising:
- an acquirer for acquiring a first trigger from a terminal apparatus;
- at least one controller that executes a service communicable with an application executed on the terminal apparatus in a case that the application is installed in the terminal apparatus;
- a display; and
- an operation inputter for acquiring a second trigger, wherein:
  - the first and second triggers are to start the service,
  - in a case that the second trigger is acquired, the controller displays a confirmation screen on the display for confirming whether the application is installed in the terminal apparatus, while executing the service,
  - in a case that the first trigger is acquired, the controller executes the service without displaying the confirmation screen on the display, and
  - in a case that an operation indicating that the application is not installed in the terminal apparatus is input on the confirmation screen, the controller displays a guide to a website where the application is able to be installed.

2. The image forming apparatus according to claim 1, wherein, in a case that the first trigger is acquired while a display screen before starting the service is being displayed on the display, the controller executes the service corresponding to the acquired first trigger.

3. The image forming apparatus according to claim 2, wherein;
- the controller displays, on the display, a portal screen, on which a user selects the service, as the display screen before starting the service, and
- in a case that the first trigger is acquired while the portal screen is being displayed, the controller executes the service corresponding to the acquired first trigger.

4. The image forming apparatus according to claim 3, wherein, in a case that an operation of acquiring the first trigger from the terminal apparatus is performed while the portal screen is being displayed, the controller displays, on the display, a first guide screen indicating that the first trigger is to be acquired from the acquirer.

5. The image forming apparatus according to claim 4, wherein the first guide screen includes a content for confirming whether the application is installed in the terminal apparatus.

6. The image forming apparatus according to claim 1, wherein:
- in a case that the second trigger is acquired, the controller further displays a first guide screen prompting a user to activate the application on the terminal apparatus, while executing the service, and
- in a case that the first trigger is acquired, the controller does not display the first guide screen.

7. The image forming apparatus according to claim 1, wherein:
- in a case that the second trigger is acquired, the controller displays a first guide screen including a first display content and a second display content, the first display content prompting a user to activate the application on the terminal apparatus, and the second display content describing an operation on the application, and
- in a case that the first trigger is acquired, the controller displays a second guide screen including only the second display content.

8. The image forming apparatus according to claim 1, wherein:
- the acquirer includes a code reader, and
- the acquirer acquires the first trigger by reading a two-dimensional code displayed on the terminal apparatus using the code reader.

9. The image forming apparatus according to claim 1, wherein, after the service has been executed and a predetermined operation has been performed in the service, the controller displays the confirmation screen on the display.

10. The image forming apparatus according to claim 1, wherein, before the service is executed, the controller displays the confirmation screen on the display.

11. The image forming apparatus according to claim 1, wherein the controller displays, on the display, a two-dimensional code including information on the website.

12. The image forming apparatus according to claim 1, further comprising an image former, wherein:
- the controller:
  - receives image data from the application, and
  - forms an image using the image former based on the received image data.

13. An execution method of executing, in an image forming apparatus, a service communicable with an application executed on a terminal apparatus in a case that the application is installed in the terminal apparatus, the method comprising:

reading a two-dimensional code displayed on an operation inputter of the image forming apparatus, or on the terminal apparatus, to acquire a trigger; and executing a service corresponding to the acquired trigger, wherein, in a case that an operation indicating that the application is not installed in the terminal apparatus is input on a confirmation screen, a guide to a website where the application is able to be installed is displayed.

* * * * *